(12) United States Patent
Nakamura et al.

(10) Patent No.: US 8,023,166 B2
(45) Date of Patent: Sep. 20, 2011

(54) OPTICAL SCANNING DEVICE AND IMAGE FORMING APPARATUS

(75) Inventors: Tadashi Nakamura, Kanagawa (JP);
Tomohiro Nakajima, Tokyo (JP);
Shigeaki Imai, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 705 days.

(21) Appl. No.: 12/028,446

(22) Filed: Feb. 8, 2008

(65) Prior Publication Data
US 2008/0192323 A1 Aug. 14, 2008

(30) Foreign Application Priority Data
Feb. 13, 2007 (JP) ................. 2007-031947

(51) Int. Cl.
*G02B 26/08* (2006.01)
(52) U.S. Cl. ............... 359/224.1; 359/209.1; 359/210.1; 359/213.1; 359/224.2
(58) Field of Classification Search .... 359/209.1–210.2, 359/199.1–199.4, 200.6–200.8, 223.1–224.2
See application file for complete search history.

(56) References Cited

U.S. PATENT DOCUMENTS

| | | | |
|---|---|---|---|
| 4,037,231 A * | 7/1977 | Broyles et al. ........... 347/246 |
| 6,621,512 B2 | 9/2003 | Nakajima et al. |
| 6,657,765 B2 | 12/2003 | Hayashi et al. |
| 6,775,041 B1 | 8/2004 | Nakajima |
| 6,813,051 B2 | 11/2004 | Suzuki et al. |
| 6,839,157 B2 | 1/2005 | Ono et al. |
| 6,932,271 B2 | 8/2005 | Nakajima et al. |
| 6,972,883 B2 | 12/2005 | Fujii et al. |
| 6,995,885 B2 | 2/2006 | Nakajima |
| 7,068,296 B2 | 6/2006 | Hayashi et al. |
| 7,149,017 B2 * | 12/2006 | Kandori et al. ............ 359/202.1 |
| 7,170,660 B2 | 1/2007 | Nakajima |
| 7,277,212 B2 | 10/2007 | Miyatake et al. |
| 2002/0122217 A1 | 9/2002 | Nakajima |
| 2003/0053156 A1 | 3/2003 | Satoh et al. |
| 2004/0032631 A1 | 2/2004 | Amada et al. |
| 2004/0036936 A1 | 2/2004 | Nakajima et al. |
| 2004/0240000 A1 | 12/2004 | Miyatake et al. |
| 2005/0062836 A1 | 3/2005 | Nakajima |
| 2005/0185237 A1 | 8/2005 | Nakajima |
| 2005/0190420 A1 | 9/2005 | Imai et al. |
| 2005/0243396 A1 | 11/2005 | Fujii et al. |
| 2006/0028533 A1 | 2/2006 | Nakajima |
| 2006/0138820 A1 | 6/2006 | Amada et al. |
| 2006/0158711 A1 | 7/2006 | Imai et al. |

(Continued)

FOREIGN PATENT DOCUMENTS
JP    63-311321    12/1988
(Continued)

OTHER PUBLICATIONS
U.S. Appl. No. 11/710,907, filed Feb. 27, 2007, Taku Amada.
(Continued)

*Primary Examiner* — James Phan
(74) *Attorney, Agent, or Firm* — Oblon, Spivak, McClelland, Maier & Neustadt, L.L.P.

(57) ABSTRACT

An optical scanning device includes, in an effective scanning area in the target surface, a mechanism that causes a scanning speed at each scanning position with respect to a scanning speed at an approximately center in the effective scanning area to be within a range under a predetermined condition.

9 Claims, 18 Drawing Sheets

U.S. PATENT DOCUMENTS

| | | |
|---|---|---|
| 2006/0232844 A1 | 10/2006 | Nakajima |
| 2006/0245009 A1 | 11/2006 | Akiyama et al. |
| 2007/0035796 A1 | 2/2007 | Nakajima |
| 2007/0058232 A1 | 3/2007 | Nakajima |
| 2007/0058255 A1 | 3/2007 | Imai et al. |
| 2007/0146738 A1 | 6/2007 | Nakajima |
| 2007/0146851 A1 | 6/2007 | Nakajima |
| 2007/0146856 A1 | 6/2007 | Nakajima |
| 2007/0206259 A1 | 9/2007 | Nakajima |
| 2007/0236557 A1 | 10/2007 | Imai et al. |
| 2007/0297036 A1 | 12/2007 | Nakamura et al. |

FOREIGN PATENT DOCUMENTS

| | | |
|---|---|---|
| JP | 8-286135 | 11/1996 |
| JP | 10-269599 | 10/1998 |
| JP | 2924200 | 5/1999 |
| JP | 3011144 | 12/1999 |
| JP | 2004-279947 | 10/2004 |
| JP | 2005-215571 | 8/2005 |

OTHER PUBLICATIONS

U.S. Appl. No. 11/765,166, filed Jun. 19, 2007, Tomohiro Nakajima.

U.S. Appl. No. 12/174,899, filed Jul. 17, 2008, Saisho, et al.

U.S. Appl. No. 12/207,739, filed Sep. 10, 2008, Imai.

U.S. Appl. No. 12/208,479, filed Sep. 11, 2008, Imai.

U.S. Appl. No. 12/204,483, filed Sep. 4, 2008, Nakamura.

* cited by examiner

OPTICAL SCANNING DEVICE AND IMAGE FORMING APPARATUS

CROSS-REFERENCE TO RELATED APPLICATIONS

The present application claims priority to and incorporates by reference the entire contents of Japanese priority document 2007-031947 filed in Japan on Feb. 13, 2007.

BACKGROUND OF THE INVENTION

1. Field of the Invention

The present invention relates to optical scanning devices applicable to optical scanning devices for use in an electrophotographic image forming apparatus.

2. Description of the Related Art

In optical scanning apparatuses, a polygon mirror or a galvanometer mirror is used as a deflector for scanning with an optical beam. To achieve higher-resolution images and higher-speed printing, the rotation speed of the deflector has to be further increased. This poses problems regarding durability of a shaft, heating due to windage loss, noise, and others, thereby limiting high-speed scanning.

To get around these problems, deflecting devices using silicon micromachining has been studied in recent years. For example, as has been disclosed in Japanese Patent No. 2924200 and Japanese Patent No. 3011144, a scheme has been suggested in which a vibration mirror and a torsion bar that pivotally supports the vibration mirror are integrally formed with a Si substrate.

According to this scheme, the size of a mirror surface can be reduced. Furthermore, since reciprocating vibrations are caused by using resonance, low noise and low power consumption can be advantageously achieved even though high-speed operation is possible. Still further, with low vibrations and little heating, the thickness of a housing that accommodates the optical scanning device can be reduced. Therefore, there is also an advantage in which image quality is hardly affected even if a low-cost resin compound with a less composition ratio of glass fiber is used.

Japanese Patent Application Laid-Open No. 2004-279947 discloses an example of an optical scanning device in which a vibration mirror is used instead of a polygon mirror.

However, when a micromirror for sine-wave vibrations is used as a deflecting unit, the deflection angle is changed in a sine wave. Therefore, an fθ lens used for a present write optical system is used for a scanning image-formation optical system, the scanning speed is low in a peripheral image height, and therefore the scanning speed on the surface to be scanned is not uniform. If the uniformity of the scanning speed is poor, image distortion and other disadvantages may occur near a main scanning direction, thereby causing deterioration in image quality. Moreover, although Japanese Patent Application Laid-Open No. 2004-279947 also discloses an electrical correction of the speed uniformity, if a difference caused by this correction from the original is large, dots become sparse or concentrated stepwise, thereby changing density and causing an image deterioration. For this reason, the amount of electrical correction has a limitation. It has been revealed from a sensory evaluation that, if the difference is steep between adjacent areas, the difference can be detected as a density difference, and therefore the limitation of the amount of correction is determined accordingly. When a vibration mirror and an fθ lens that vibrate in a sine wave are used, the amount of correction required for uniform-speed scanning exceeds this limitation of the amount of correction, and therefore an electric correction cannot fully satisfy the need for correction.

To get around this problem, Japanese Patent Application Laid-Open No. 2005-215571 discloses the use of a scanning image-formation optical system having an image-formation characteristic (f·arcsin characteristic) as represented by:

$$H = K \times \sin^{-1}(\theta/2\theta_{max})$$

where H is an image height, K is a proportionality factor, θ is a deflection angle, and $\theta_{max}$ is an amplitude (maximum deflection angle). With this, an optical scanning device can be obtained that optically corrects the waist position of main-scanning ray bundle to achieve a wide effective write width and excellent scanning-speed uniformity.

However, if an optical correction is performed in the scanning image-formation optical system, a light beam enters a scanning image-formation optical element, in which the shape and refracting power is changed depending on the image height, at a different position with a different angle depending on the image height. Therefore, in particular, a deterioration occurs in wavefront of the light beam on the image-formation optical element in a peripheral image height, thereby disadvantageously causing a deterioration in beam-spot diameter and further causing a deterioration in image quality due to a wave optical aberration. Moreover, a deviation between image heights of a spot diameter of the main-scanning ray bundle on the surface to be scanned is large, thereby causing a deterioration in image quality.

Still further, Japanese Patent Application Laid-Open No. 8-286135 discloses an example in which a mechanism is provided that adjusts the positions of a light source or a coupling lens, and a cylindrical lens in an optical-axis direction to correct a beam-spot diameter on the surface of a photosensitive member. However, the number of such mechanisms that adjust the positions of the optical elements is two or more. Therefore, there are problems of less stability as a system, necessity of a scanning image-formation optical system of an fθ optical system even if an adjustment mechanism is provided, and inferiority to a vibration mirror in heating, vibration, noise, power consumption, and others due to the use of a polygon mirror.

Moreover, Japanese Patent Application Laid-Open No. H10-269599 discloses an optical pickup device in which it possible to reduce a focal distance of a variable focus lens part in a structure including the variable focus lens part and a fixed objective lens.

SUMMARY OF THE INVENTION

It is an object of the present invention to at least partially solve the problems in the conventional technology.

According to an aspect of the present invention, there is provided an optical scanning device including a light source; a light-source driving unit that controls a modulation clock for modulating the light source; an optical element that causes a light beam from the light source to be in a predetermined state; and at least one optical deflector formed of a vibration mirror supported by a torsion bar to deflect the light beam from the light source to scan a target surface. In an effective scanning area in the target surface, a mechanism is provided that causes a scanning speed at each scanning position with respect to a scanning speed at an approximately center in the effective scanning area to be within a range under a predetermined condition.

According to another aspect of the present invention, there is provided an image forming apparatus including the above optical scanning device for scanning a target surface for image formation.

According to another aspect of the present invention, there is provided a multicolor-capable image forming apparatus comprising an optical scanning device for scanning a plurality of target surfaces for image formation.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below while referring to the accompanying drawings.

Figure 1:
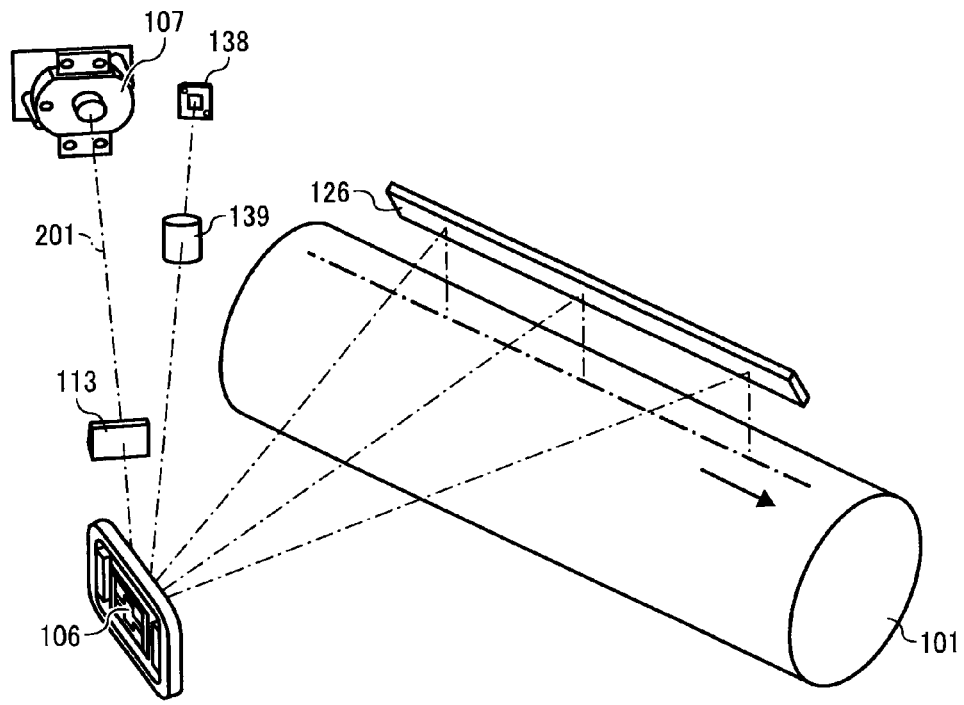
FIG. 1 is a schematic drawing of the configuration of an optical scanning device for explaining an embodiment of the present invention.

FIG. 1 is a schematic drawing of the configuration of an optical scanning device for explaining an embodiment of the present invention. In FIG. 1, a reference numeral 101 denotes a photoconductive photosensitive drum serving as a surface to be scanned, a reference numeral 106 denotes a vibration mirror serving as an optical deflector, a reference numeral 107 denotes a light-source unit including therein a light source and a coupling lens, a reference numeral 113 denotes a cylindrical lens with a convergence force in a sub-scanning direction, a reference numeral 126 denotes a folding mirror that guides a light beam with which scanning is performed by the vibration mirror 106 to the surface of the photosensitive drum, a reference numeral 138 denotes a synchronization detecting sensor provided outside an effective scanning area, a reference numeral 139 denotes an image-forming lens for detecting synchronization that forms an image of the beam on the synchronization detecting sensor, and a reference numeral 201 denotes an optical path of the light beam emitted from the light-source unit 107 for scanning the photosensitive drum 101 by the vibration mirror 106.

The light beam emitted from the light source in the light-source unit 107 is emitted by the coupling lens in a predetermined state. In the present embodiment, the light beam is in a converging state in which a beam waist position in a main scanning direction is near the surface of the photosensitive drum 101.

After emitted from the coupling lens, the light beam 201 becomes in a predetermined converging state in a sub-scanning direction at the cylindrical lens 113. In the present embodiment, in the main scanning direction, the predetermined converging state is caused by the coupling lens. However, normally, a semiconductor laser for use mainly as a light source has different angles of divergence in the main and sub-scanning directions. In a coupling lens, in which the convergence force in the main scanning direction is approximately equal to the convergence force in the sub-scanning direction, at the time of the predetermined converging state in the main scanning direction, a desired converging state cannot achieved in the sub-scanning direction. To get around this, with the cylindrical lens 113 having a convergence force only in the sub-scanning direction, the converging state is achieved such that the beam waist position in the sub-scanning direction is near the surface of the photosensitive member.

Also, the cylindrical lens 113 may have depression power (negative refracting power) so that the beam waist position in the sub-scanning direction is near the surface of the photo-sensitive member.

The beam shaped as explained above then enters the vibration mirror 106 as an optical deflector. With the reflecting surface of the vibration mirror 106 rocking, the surface of the photosensitive drum 101 as the surface to be scanned is scanned with the light beam.

The beam deflected by the vibration mirror 106 is guided by the folding mirror 126 to the photosensitive drum 101. Although the optical scanning device exemplarily includes a folding mirror in the present embodiment, alternatively, this folding mirror may not be disposed, and the photosensitive drum 101 may be disposed so that the light is guided to the photosensitive drum 101.

Figure 2:
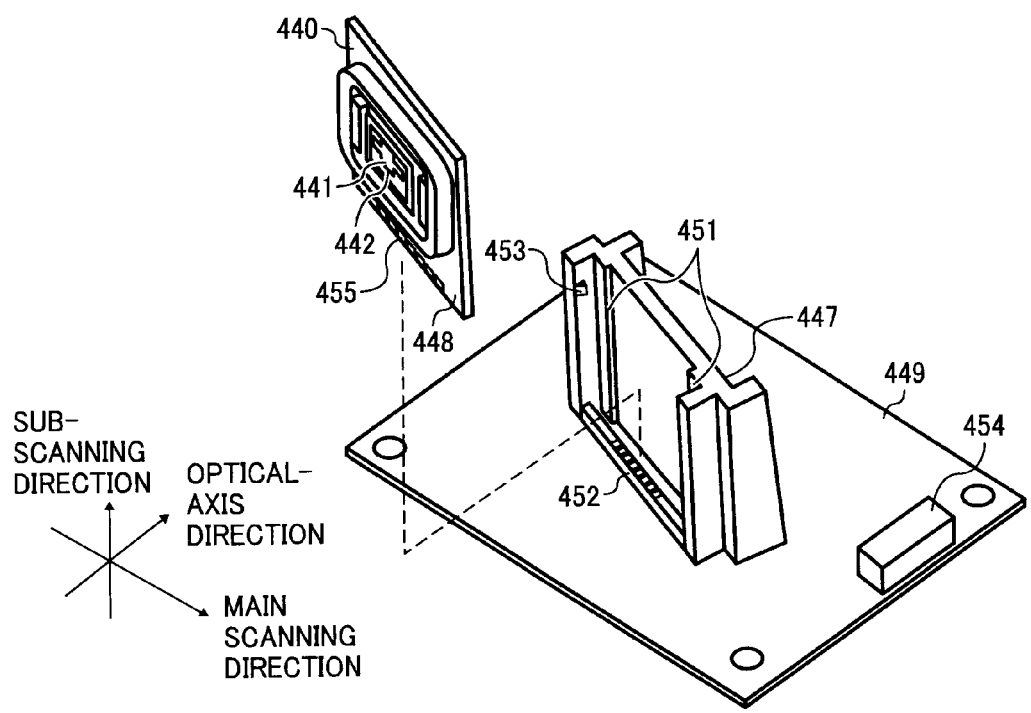
FIG. 2 is an exploded perspective view of an example of a vibration-mirror module for use in the optical scanning device of FIG. 1.

FIG. 2 is an exploded perspective view of a vibration-mirror module for use in the optical scanning device.

In the present embodiment, an electromagnetic driving scheme is explained as an example as a method of generating a running torque of the vibration mirror 106.

As depicted in FIG. 2, a vibration mirror 441 is pivotally supported by a torsion bar 442, is manufactured, as explained further below, by penetrating through a single Si substrate from its outer shape through etching, and is mounted on an implementation substrate 448 to form a vibration-mirror substrate 440.

In the present embodiment, a pair of vibration-mirror substrates 440 is integrally supported back to back to form a module.

A supporting member 447 is formed of resin, is positioned at a predetermined position on a circuit board 449, and includes, integrally with the vibration-mirror substrate 440: a positioning unit 451 that positions the torsion bar so that it is orthogonal to a main scanning plane and a mirror surface is tilted at a predetermined angle, 22.5 degrees in the present embodiment, with respect to the main scanning direction; and an edge connector unit 452 on which metal terminals are arranged so that wiring terminals 455 formed on one side of the implementation substrate 448 of the vibration-mirror substrate make contact with the metal terminals at the time of insertion.

In this manner, the vibration-mirror substrate 440 has one side inserted in the edge connector unit 452 explained above, fits in the inside of a holding nail 453, and has both side surfaces on the rear side supported along the positioning unit 451. Also electrical wiring is simultaneously achieved to allow separate replacement of each vibration-mirror substrate 440.

Here, the circuit board 449 has implemented thereon a control IC and a crystal oscillator forming a vibration-mirror driving circuit, which will be explained further below, and have power and control signals input thereto and output therefrom through a connector 454.

Figure 3:
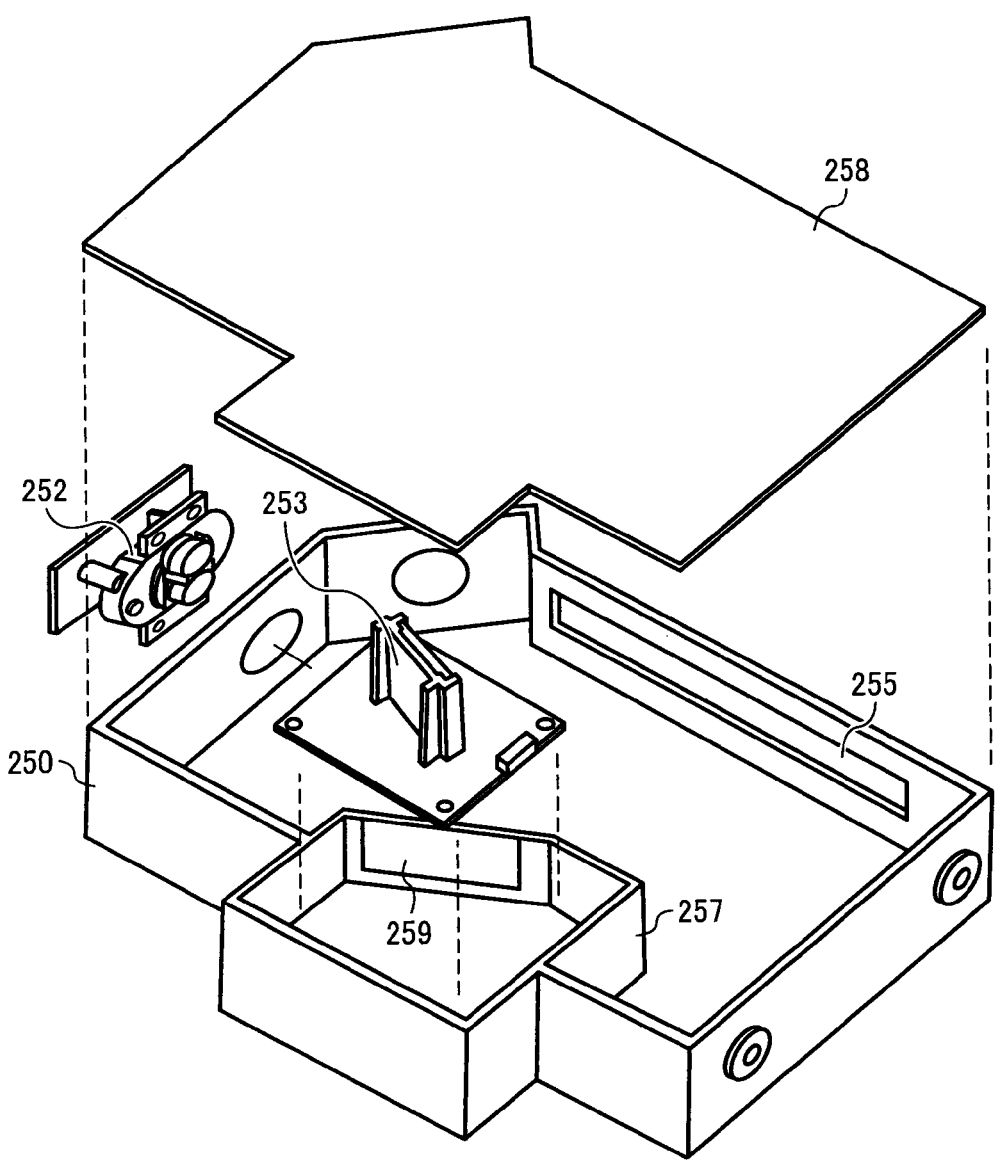
FIG. 3 is an exploded perspective view of an example of an optical housing of the optical scanning device, the optical housing having accommodated therein the vibration-mirror module of FIG. 2.

As depicted in FIG. 3, a vibration-mirror module 253 is inserted in an optical housing 250 integrally forming side walls 257 standing so as to surround the vibration-mirror module 253. An upper edge of the side walls 257 is sealed by an upper cover 258 to shut out of outside air, thereby preventing changes in amplitude due to convection of outside air. An opening portion of a side wall from which a light beam comes and goes is provided with a flat-plate-shaped transmission window 259.

Here, in FIG. 3, a reference numeral 252 denotes a light-source unit module 252 (corresponding to the light-source unit 107 explained above) fixed to another side wall portion of the optical housing 250, and a reference numeral 255 denotes an opening portion of the optical housing 250 from which a light beam is emitted. This opening portion 255 is provided with a dustproof glass.

Figure 4:
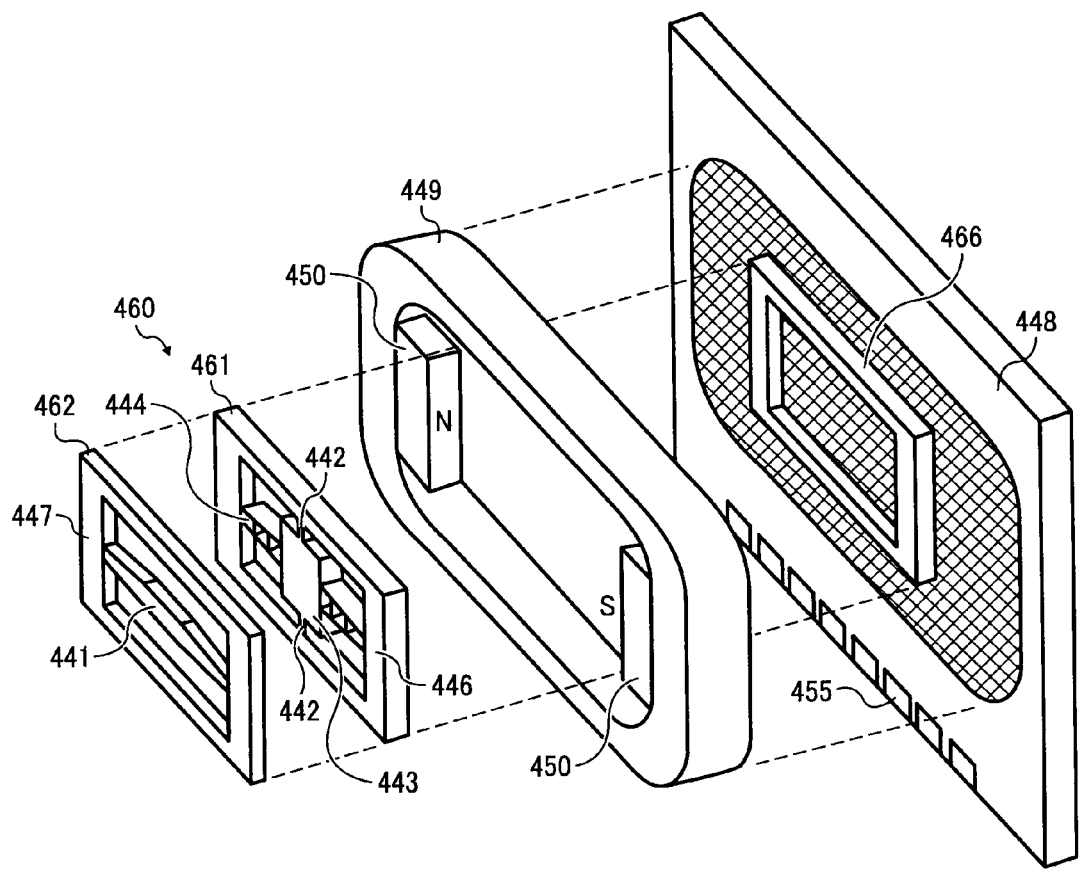
FIG. 4 is an exploded perspective view of a vibration-mirror substrate forming the vibration-mirror module of FIG. 2.

FIG. 4 is an exploded perspective view of the vibration-mirror substrate 440. A vibration-mirror unit 460 includes a movable unit forming a mirror surface on its surface and serving as a vibrator, a torsion bar supporting the movable unit and serving as a rotating shaft, and a frame serving as a supporting unit, and is formed by cutting a Si substrate through etching.

In the present embodiment, the vibration-mirror unit is manufactured by using a wafer called an SOI substrate in which two substrates, one with 60 micrometers and the other one with 140 micrometers are bonded together in advance as interposing an oxide film therebetween.

First, portions other than the torsion bar 442, a vibrating plate 443 on which a flat coil is formed, a reinforcing bar 444 forming a framework of the movable unit and a frame 446 are formed through a dry process based on plasma etching by penetration from the front surface side of a 140-micrometer substrate (second substrate) 461 to the oxide film. Next, portions other than the vibration (movable) mirror 441 and a frame 447 are formed through anisotropic etching, such as KOH, by penetration from the front surface side of a 60-micrometer substrate (first substrate) 462 to the oxide film. Finally, the oxide film surrounding the movable unit is removed for separation to form a vibration-mirror structure. Here, the width of the torsion bar 442 and the reinforcing bar 444 is assumed to be 40 micrometers to 60 micrometers.

As explained above, to achieve a large deflection angle, a moment of inertia I of the vibrator is preferably small. However, the mirror surface is deformed by the inertial force, the movable unit has a volume-lightning structure in the present invention.

Furthermore, an aluminum thin-film is vapor-deposited on the front surface side of the 60-micrometer substrate 462 as a reflecting surface. On the front surface side of the 40-micrometer substrate 461, a terminal (not shown) wired with a copper thin film via a coil pattern (not shown) and the torsion bar and a patch for trimming (not shown) are formed. As a matter of course, a thin-film permanent magnet can be formed on a vibrating plate 443 side, and the flat coil can be formed on a frame 447 side.

On the implementation substrate 448, a frame-shaped base 466 in which the vibration-mirror unit 460 is inserted and a yoke 449 formed so as to surround the vibration-mirror unit

460. In the yoke 449, paired permanent magnets 450 are bonded to face an end of the movable mirror, the paired permanent magnets having an S pole and an N pole face each other to generate a magnetic field in a direction orthogonal to a rotational axis. This yoke 449 is fixed onto the implementation substrate 448 with an adhesive or the like.

The vibration-mirror unit 460 is inserted in the base 466 with its mirror surface to the front. With a current flowing between terminals not shown, a Lorenz force occurs at each side parallel to the rotational axis of the coil pattern, thereby generating a running torque T for rotating the vibration (movable) mirror 441 by twisting the torsion bar 442. When the current is cut off, the vibration-mirror unit is returned to horizontal by a return force of the torsion bar 442.

Therefore, by alternately switching the direction of the current flowing the coil pattern, the vibration mirror 441 can be vibrated in a reciprocating manner.

When the cycle of switching the current is near a unique frequency of a primary vibration mode of the structure forming the vibration mirror with the torsion bar as a rotating axis, that is, so-called resonance frequency f0, the amplitude is excited to obtain a large deflection angle.

Therefore, normally, a scanning frequency fd is controlled so as to be set at this resonance frequency f0 or to follow the resonance frequency f0. However, as explained above, the resonance frequency f0 is determined by the moment of inertia I of the vibrator forming the vibration mirror 460. Therefore, if there are variations in finished dimensional accuracy, a difference occurs among a plurality of vibration-mirror units 460 when use, and it is thus difficult to equalize scanning frequencies fd of these units.

Variations in resonance frequency f0 are on the order of ±200 Hertz, although depending on process capability. For example, when the scanning frequency fd=2 kilo Hertz, a shift in scanning line pitch corresponding to a 1/10 line occurs. Thus, when an A4-size sheet is output, a scaling shift of several tens millimeters occurs at the final end.

It may be possible to combine vibration-mirror units each with a scanning frequency near the resonance frequency f0 by selection, but production efficiency is poor and also high cost is required because replacement is always performed as a pair.

To get around these problems, when a plurality of vibration mirrors are used, before they are mounted on the implementation substrate, the patch (not shown) formed on the rear side of the movable unit is cut by a carbon dioxide laser or the like to gradually reduce the mass of the movable unit, thereby adjusting the moment of inertia I to be within, in the present embodiment, ±50 Hertz, so that the resonance frequencies f0 approximately coincide with one another even if the vibration mirrors have a dimensional difference.

Then, within their frequency band, the scanning frequency fd is set irrespectively of the resonance frequency f0.

Figure 5:
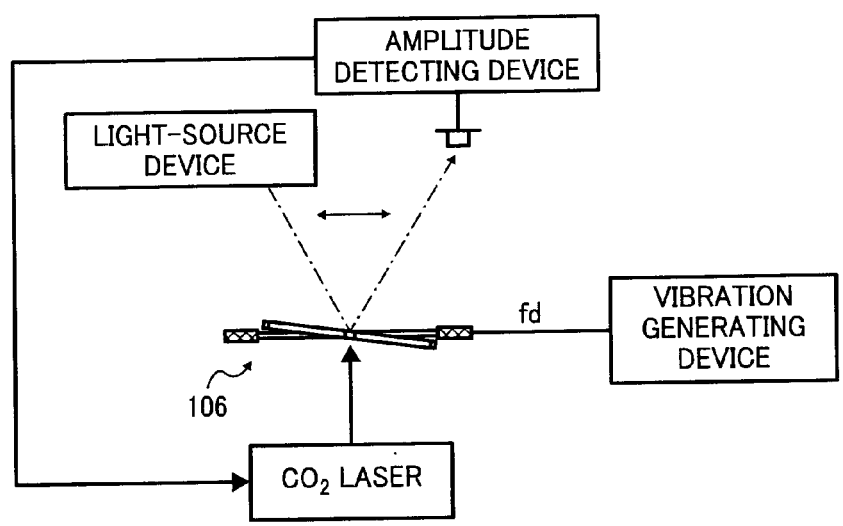
FIG. 5 is a drawing that depicts a state of adjustment of a resonance frequency by changing (trimming) of the mass of the vibration mirror.

FIG. 5 is a drawing that depicts a state of adjustment of a resonance frequency by changing (trimming) of the mass of the vibration mirror. To the vibration mirror, vibrations corresponding to the scanning frequency are provided by a vibration generating device. The patch is radiated with a carbon dioxide ($CO_2$) laser from the rear side of the vibration mirror, and a cut is formed until the deflection angle is abruptly increased by resonance.

A resonance state can be detected by applying a light beam by a light-source device from the front side of the vibration mirror and detecting a vibration of the reflected light beam by an amplitude detecting device.

Here, in place of such reduction-type trimming, an increase-type scheme of adding a balance weight may be used.

Figure 6:
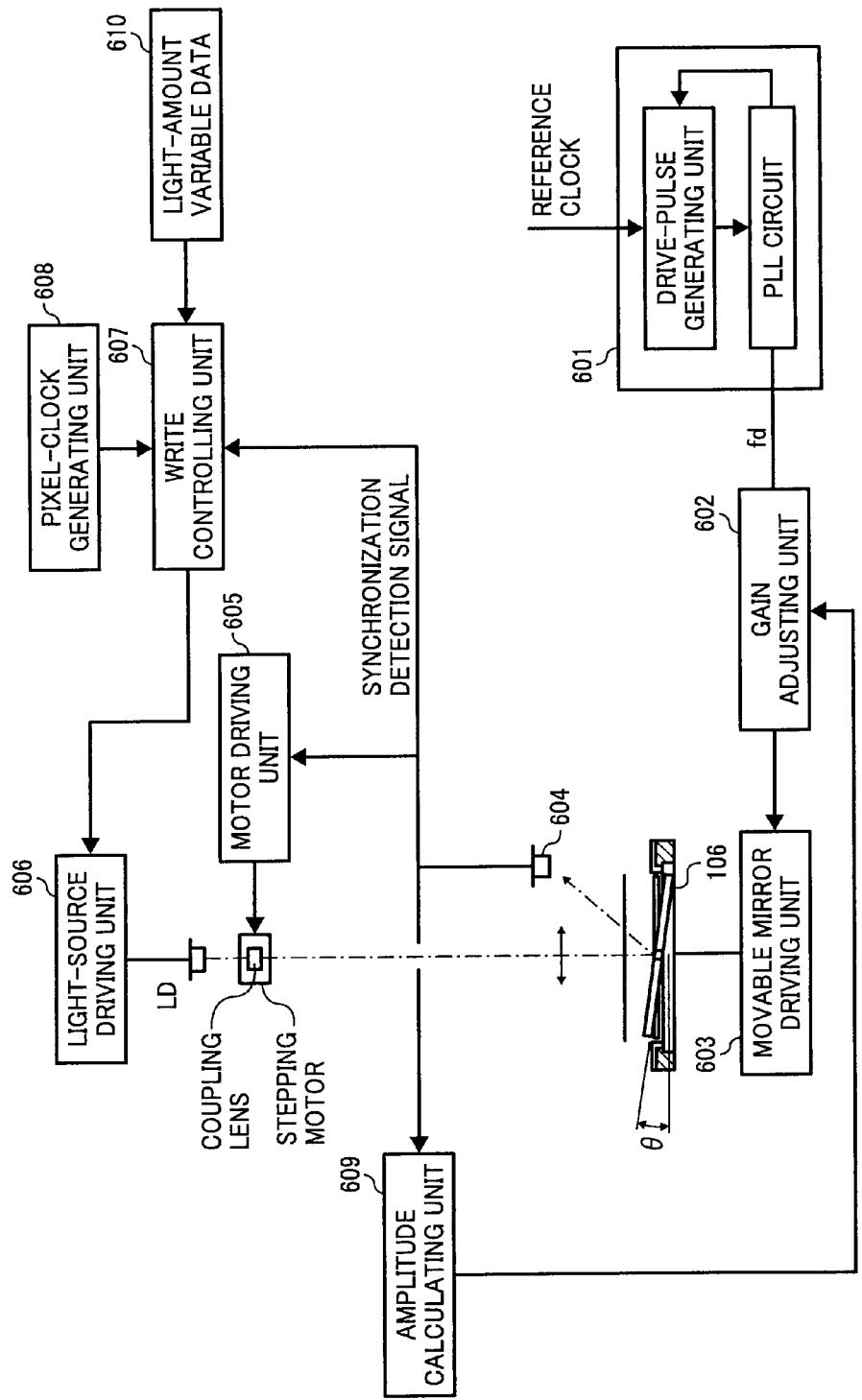
FIG. 6 is a block diagram of an example of a driving control system in the optical scanning device according to a first embodiment.

FIG. 6 is a block diagram of an example of a driving control system in the optical scanning device according to the present embodiment. This driving control system includes, for example, driving circuits 601 to 603 of the vibration mirror 106, a driving circuit 605 that drives a coupling lens (for example, a collimator lens) in the light-source unit 107, and write control systems 606 to 608 that control driving of a light source (LD).

As explained above, a voltage or pulse-wave voltage is applied to the flat coil formed on the rear side of the vibration mirror 106 so that the current-flowing direction is alternately switched. The vibration mirror is vibrated in a reciprocating manner with the gain of the current flowing the flat coil being adjusted so that the deflection angle θ is constant.

Figure 7:
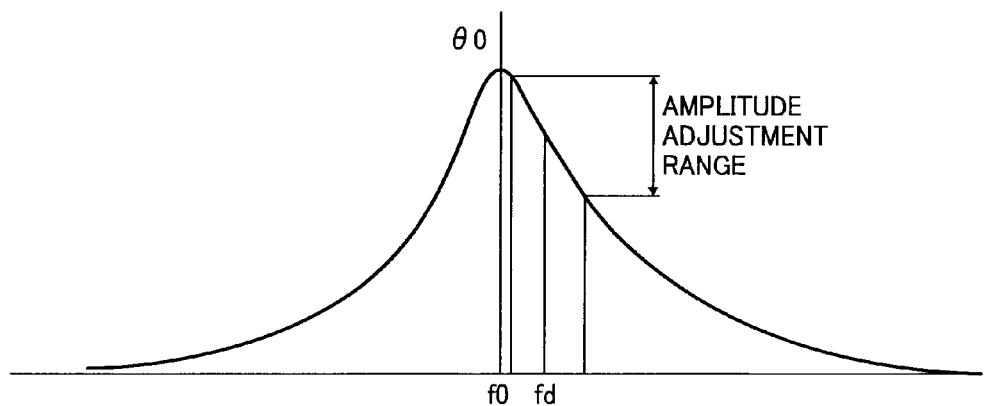
FIG. 7 is a drawing that depicts a relation between frequency f and deflection angle θ for switching the direction in which a current is passed through a flat coil of the vibration mirror.

FIG. 7 is a drawing that depicts a relation between a frequency f and a deflection angle θ for switching the direction in which a current is passed through a flat coil of the vibration mirror. In general, the frequency characteristics with the resonance frequency f0 as a peak can be observed. If the scanning frequency fd is made equal to the resonance frequency f0, the largest deflection angle can be obtained, but the deflection angle is abruptly changed near the resonance frequency.

Therefore, initially, the driving frequency to be applied to a fixed electrode can be set at the resonance frequency by the driving controlling units 601 to 603, but when the resonance frequency is fluctuated due to changes of a spring constant associated with temperature changes, the deflection angle is drastically reduced, and therefore there is a disadvantage of poor stability with time.

To get around this disadvantage, the scanning frequency fd is fixed at a single frequency other than the resonance frequency f0, and the deflection angle θ can be increased or decreased by the movable-mirror driving unit 603 according to gain adjustment of a gain adjusting unit 602.

Specifically, for the resonance frequency f0=2 kilo Hertz, the scanning frequency fd is set at 2.5 kilo Hertz, and the deflection angle θ is ≅25 degrees through gain adjustment.

In view of time-lapse, the deflection angle θ is detected by an amplitude calculating unit 609 from a time difference between a detection signal with which the light beam for scanning with the vibration mirror 106 is detected by a synchronization detecting sensor 604 that is disposed at a leader of the scanning area at return scanning and a detection signal with which the light beam is detected thereby at forward scanning. The gain is then adjusted by the gain adjusting unit 602 so that the deflection angle θ is constant to control the deflection angle θ at the movable-mirror driving unit 603.

Figure 8:
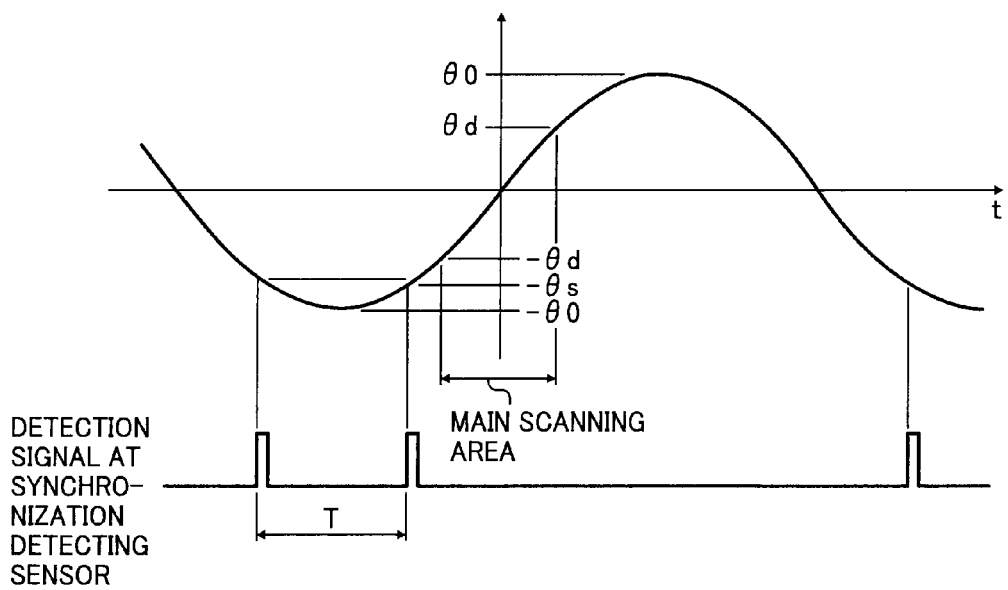
FIG. 8 is a drawing that depicts changes of a scanning angle of the vibration mirror and a detection signal at a synchronization detecting sensor.

As depicted in FIG. 8, since the vibration mirror 106 is subjected to resonance vibration, the scanning angle θ is changed with time in a sine wave.

Therefore, when the maximum deflection angle of the vibration mirror, that is, the amplitude, is θ0, $$\theta = \theta_0 \cdot \sin 2\pi fd \cdot t \text{ holds.}$$

When a beam with a scanning angle corresponding to 2θs is detected by the synchronization detecting sensor 604, detection signals are generated at forward scanning and return scanning, and when their time difference T is used, $$\theta s = \theta_0 \cdot \cos 2\pi fd \cdot T/2 \text{ holds.}$$

Because θs is fixed, it can be apparent that the maximum deflection angle θ0 can be detected by measuring T.

Here, during a period from a beam detection at return scanning to a beam detection at forward scanning, that is, during a period in which the deflection angle of the vibration mirror is θ0>θ>θs light emission from a light-emitting source is stopped.

In the optical device according to the present embodiment, a field curvature is corrected at a conventional optical scanning device, and a scanning lens performing a function of adjusting a beam waist position on the surface of the photosensitive member is not included. Therefore, in the optical scanning device according to the present embodiment, as depicted in FIG. 6, the coupling lens is driven in synchronization with the vibration mirror to adjust the beam waist position on the image surface based on the image height, thereby correcting the field curvature.

Here, by using FIG. 6, a method of driving the coupling lens in the light-source unit 107 is explained.

As explained above, for control such that the deflection angle θ of the vibration mirror 106 is constant, the synchronization signal detected at the synchronization detecting sensor 604 is also input to the motor-driving unit 605 to control a stepping motor having mounted thereon the coupling lens in a manner such that the position of the coupling lens in an optical-axis direction is displaced in synchronization with the vibration mirror 106.

Figure 9:
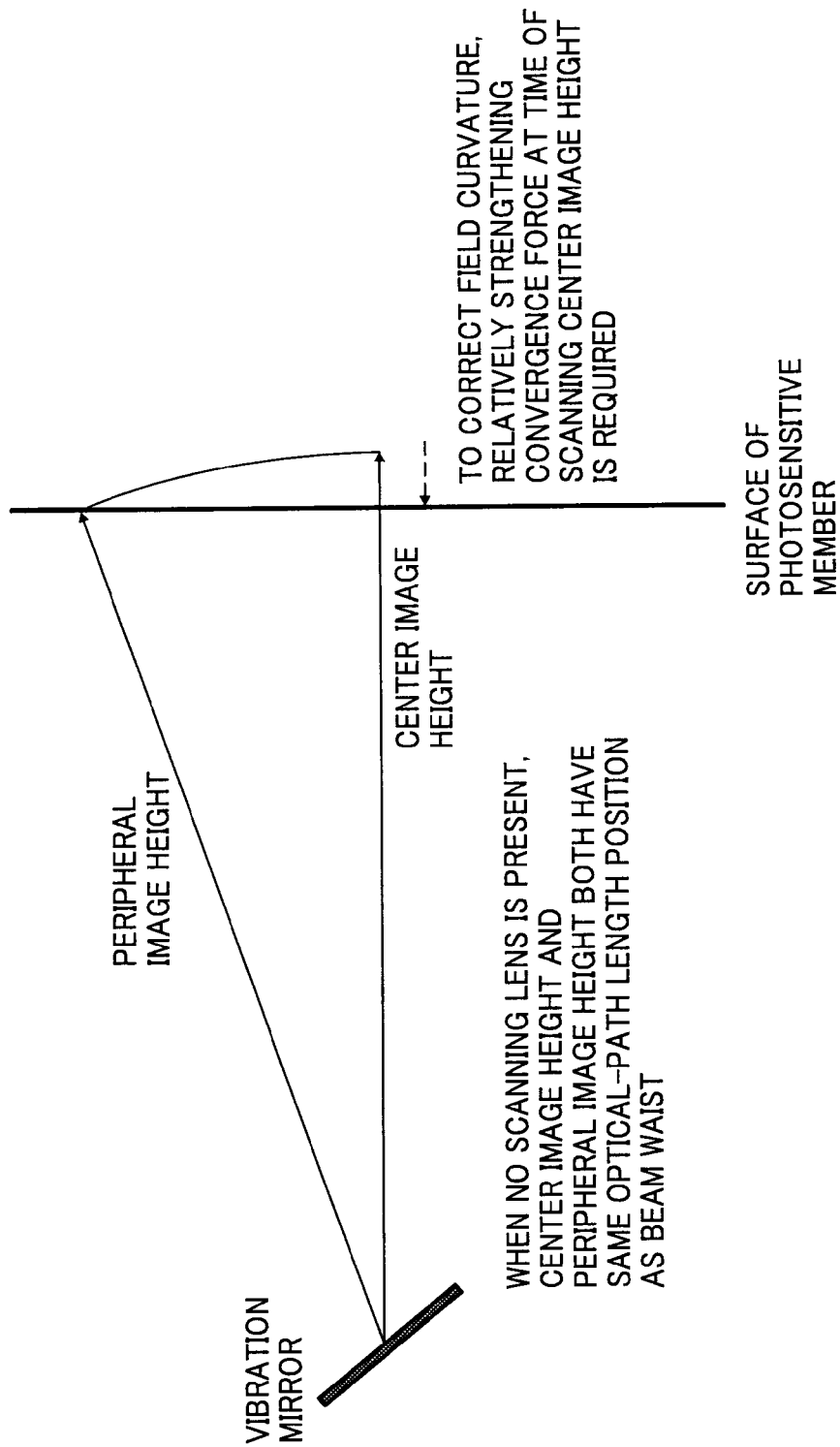
FIG. 9 is a schematic drawing of the optical scanning device for explaining a correction of a field curvature.

FIG. 9 is a schematic drawing of the optical scanning device for explaining a correction of a field curvature. In a distance from the vibration mirror as an optical deflector to the surface of the photosensitive member as an image surface, an optical-path length at a peripheral image height is longer than an optical-path length at a center image height. Therefore, the position of the coupling lens is determined so that the beam after passing through the coupling lens has a stronger converging state than that at the center at the time of peripheral-image-height scanning.

Figure 10:
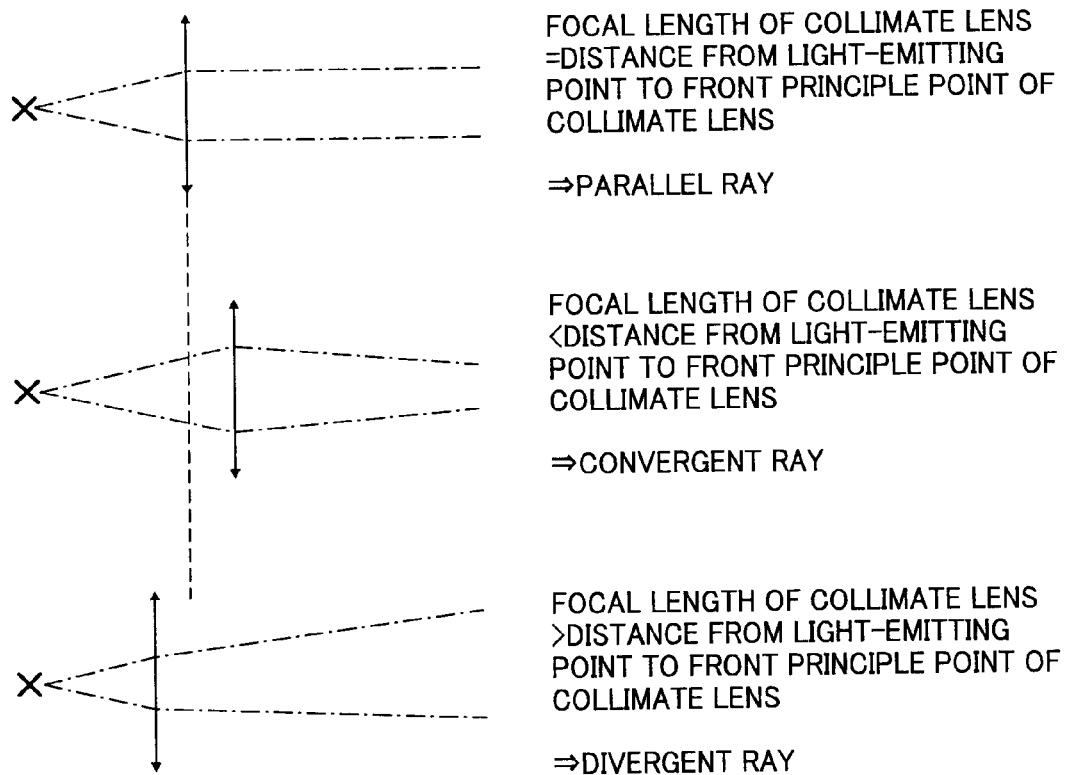
FIG. 10 is a drawing that depicts a state of a ray bundle due to a difference in position between a light-emitting point and a coupling lens.

Specifically, the state of the ray bundle due to a positional difference between a light-emitting point and the coupling lens (for example, a collimate lens) has a relation as depicted in FIG. 10, the focal length of the coupling lens is determined so as to be longer than a distance from a light-emitting point for a peripheral image height to a front principle point of the coupling lens. With such an arrangement, the field curvature can be excellently corrected, the beam-spot diameters on the surface of the photosensitive member as an image surface can be made uniform, and image quality can be improved.

Also, the present invention is not restricted to the case in the present embodiment where the cylindrical lens has a converging force only in the sub-scanning direction, but also can be applied to a case where the cylindrical lens has a converging force also in the main scanning direction and the arrangement is such that the position of the coupling lens is near a light-emitting point side. With this, in view of ensuring the light amount, an advantageous arrangement can be achieved.

Figure 17:
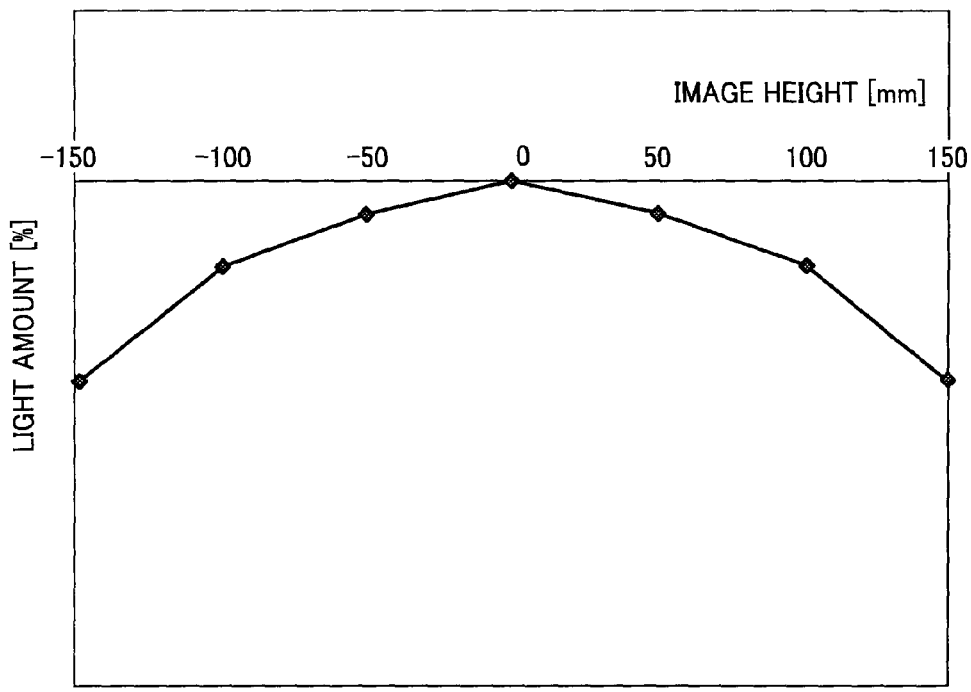
FIG. 17 is a drawing that depicts a relation between an image height on a surface to be scanned (image surface) and a light amount.

According to the movement of the coupling lens in an optical-axis direction, the coupling efficiency between image heights becomes varied. With the coupling efficiency being varied between image heights, a deterioration in image quality may occur if there is an unevenness in the light amount. To get around this problem, in the present embodiment, an optical element having a shading effect is used as the folding mirror 126 so that the light amount of the beam at the time of center image-height scanning on the surface to be scanned (image surface) is relatively larger than the light amount of the beam at the time of peripheral image-height scanning, as a relation between the image height and the light amount depicted in FIG. 17. Also, in place of the folding mirror, an optical element having a shading effect as explained above may be disposed as at least one of the optical elements forming the optical scanning device.

Here, when a vibration mirror vibrating in a sine wave is used as an optical scanning device as depicted in FIG. 8, if the surface to be scanned is linear as in the present embodiment, a linearity V representing speed uniformity of the scanning can be represented by Equation (1):

$$V = L\omega[\cos(\theta)]^2 \tag{1}$$

L: distance from the optical deflector (vibration mirror) to the surface to be scanned (image surface)
ω: angular velocity of the optical deflector (vibration mirror)
θ: deflection angle of the optical deflector (vibration mirror)

Here, the linearity V means a scanning speed of the peripheral image height with respect to a scanning speed of the center image height and, in other words, represents a change in image height with respect to a unit deflection-angle change. Also at this time, since the vibration mirror is vibrated in a sine wave, its angular velocity ω can be represented by Equation (2):

$$\omega = 2\pi\theta_{max} f \cos\left[\sin^{-1}\left(\frac{\theta}{\theta_{max}}\right)\right] \tag{2}$$

f: driving frequency of the optical deflector (deflection angle of vibration mirror)
θ: deflection angle of the optical deflector (maximum amplitude vibration mirror)
$\theta_{max}$: maximum deflection angle of the optical deflector (vibration mirror)

Figure 11:
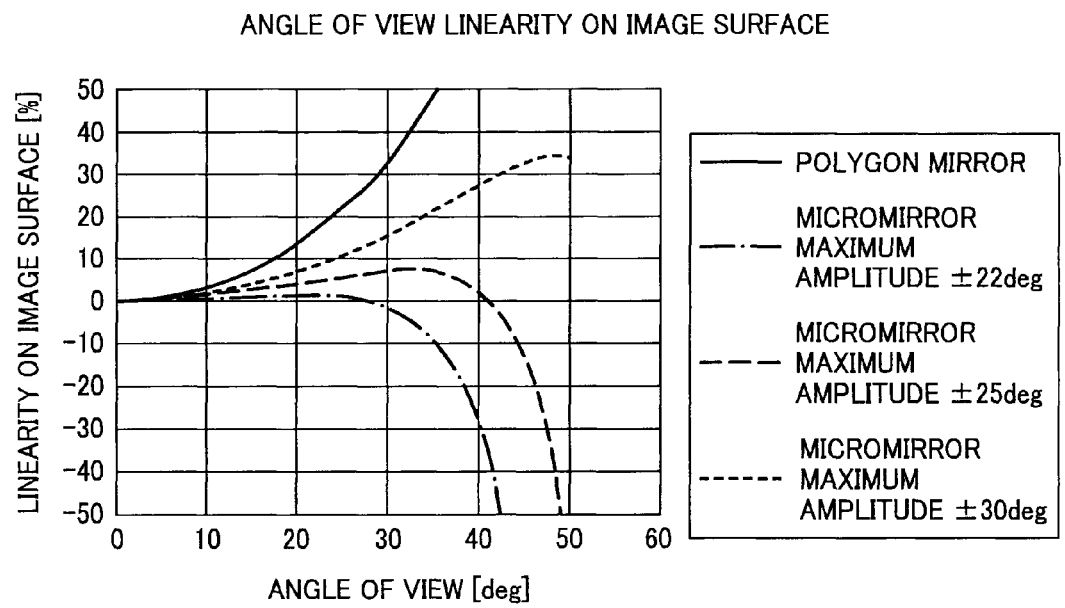
FIG. 11 is a drawing that depicts a relation between an angle of view of an optical deflector and linearity on field.

As for Equations (1) and (2), a plotted graph is depicted in FIG. 11, with a maximum amplitude of the vibration mirror being taken as a parameter, the horizontal axis representing an angle of view (in the present embodiment, the angle of view takes a value obtained by approximately doubling the deflection angle (deflection angle of the vibration mirror) θ of the optical deflector), and the vertical axis representing a linearity on the image surface with reference to the center image height. In FIG. 11, uniform-speed scanning is performed with the value of the linearity on the vertical axis being 0. Therefore, as described above, if this linearity is large, the uniformity of the scanning speed on the surface to be scanned (image surface) is lost. If the uniformity of the scanning speed is lost, an image distortion occurs near the main scanning direction, for example, thereby disadvantageously causing a deterioration in image quality. Therefore, the linearity is required to be close to 0% as much as possible.

Figure 12:
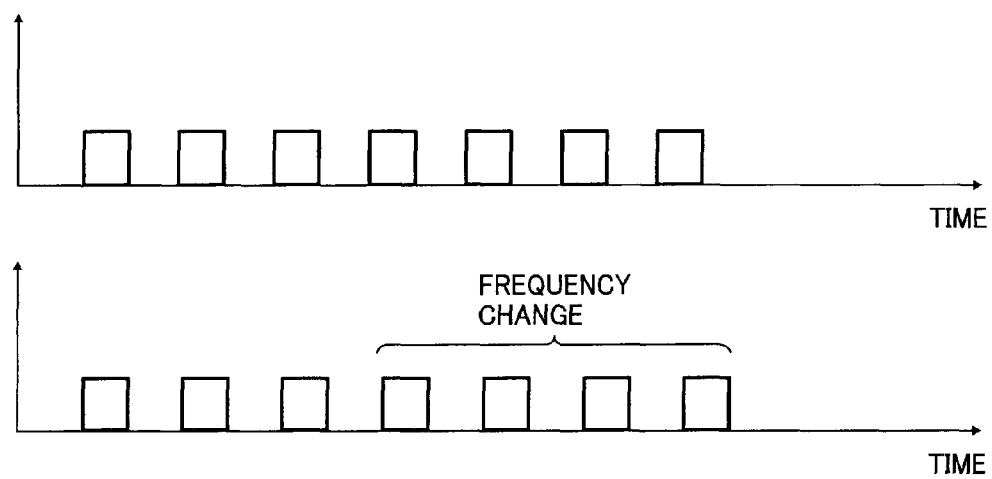
FIG. 12 is a drawing that depicts, as a model, a signal of an injection current when the horizontal axis represents time and a clock frequency of a light source is modulation-driven for every other dot by a light-source driving unit.
Figure 13:
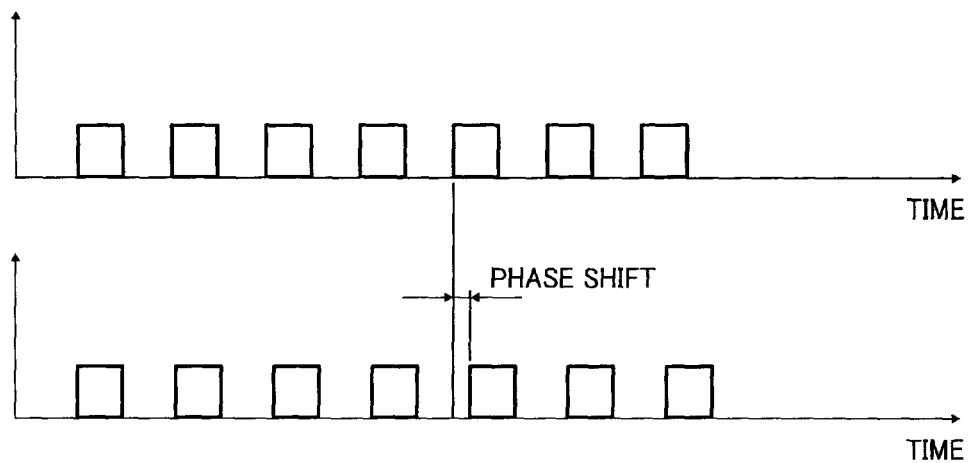
FIG. 13 is a drawing that depicts, as a model, a signal of an injection current when the horizontal axis represents time and a clock phase of a light source is modulation-driven for every other dot by a light-source driving unit.

On the other hand, it is effective that, as depicted in FIG. 12, a clock frequency of the light source is relatively varied according to the position in the main scanning direction, or, as depicted in FIG. 13, a phase-shift amount of the clock is relatively varied according to the position of the main scanning direction.

More preferably, the clock frequency of the light-source driving unit 606 and also the phase-shift amount of the clock are relatively varied according to the position in the main scanning direction, thereby further efficiently correcting the linearity. For example, in a write optical system using a vibration mirror that vibrates in a sine wave, when the beam-spot diameters are adjusted to be uniform on the surface of the photosensitive member by using a scanning lens, the write optical system has a characteristic in which the linearity significantly deteriorates at the stage of design values. Here, linearity fluctuations set as design values are corrected by making the clock frequency of the light-source driving unit 606 variable. On the other hand, variations from the design values of linearity due to tolerances occurring at the time of processing and assembling are corrected by controlling the clock phase-shift amount. In this manner, by using two stages of modulation clock controlling units of two light sources, the linearity in the write optical system using a vibration mirror and a scanning lens can be corrected with high accuracy.

Here, FIG. 12 depicts, as a model, a signal of an injection current when the horizontal axis represents time and a clock frequency of the light source is modulation-driven for every other dot by the light-source driving unit 606. FIG. 13 depicts, as a model, a signal of an injection current when the horizontal axis represents time and a clock phase of the light source is modulation-driven for every other dot by the light-source driving unit 606.

With such an electrical light-source driving control, a deterioration in linearity in the scanning optical system is corrected, the uniformity of the scanning speed is kept, and a deterioration in image quality can be prevented.

In the optical scanning device according to the present embodiment, more preferably, in an effective scanning area in the surface to be scanned, a scanning speed (linearity) at each scanning position with respect to a scanning speed at an approximately center in the effective scanning area is within a range satisfying a condition represented by the following Inequality 3.

$$-12.5[\%] < \left( \frac{\cos\left(\arcsin\left(\frac{\theta}{\theta_{max}}\right)\right)}{\cos^2\theta} - 1 \right) \times 100 < 12.5[\%] \qquad (3)$$

$\theta$=deflection angle of the optical deflector
$\theta_{max}$=maximum deflection angle of the optical deflector When the vibration mirror is driven under the condition satisfying Inequality 3, no scanning lens is required for write optical system, the linearity can be efficiently corrected, and the image quality can be improved. This is because the limit amount of correction is defined in a method of correcting the linearity with the clock frequency of the light source being varied by the light-source driving unit 606 according to the position in the main scanning direction and the method of correcting the linearity with the clock phase-shift amount of the light source being varied according to the position in the main scanning direction, and the correction amount is set at a value with which a stepwise difference is not so conspicuous.

Here, a method of deriving the linearity in the conditional expression represented by Inequality 3 explained above is explained.

Figure 26:
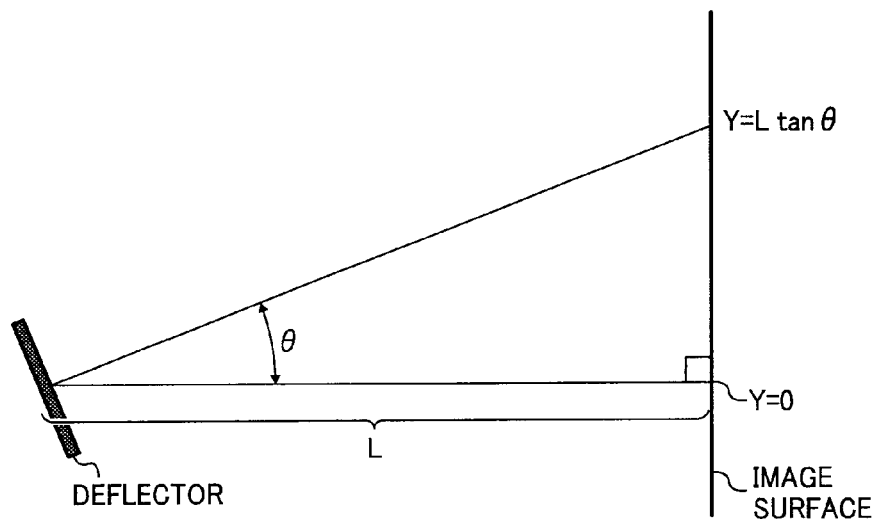
FIG. 26 is a drawing for explaining a relation between a distance from a deflector to the image surface and an image height.
Figure 27:
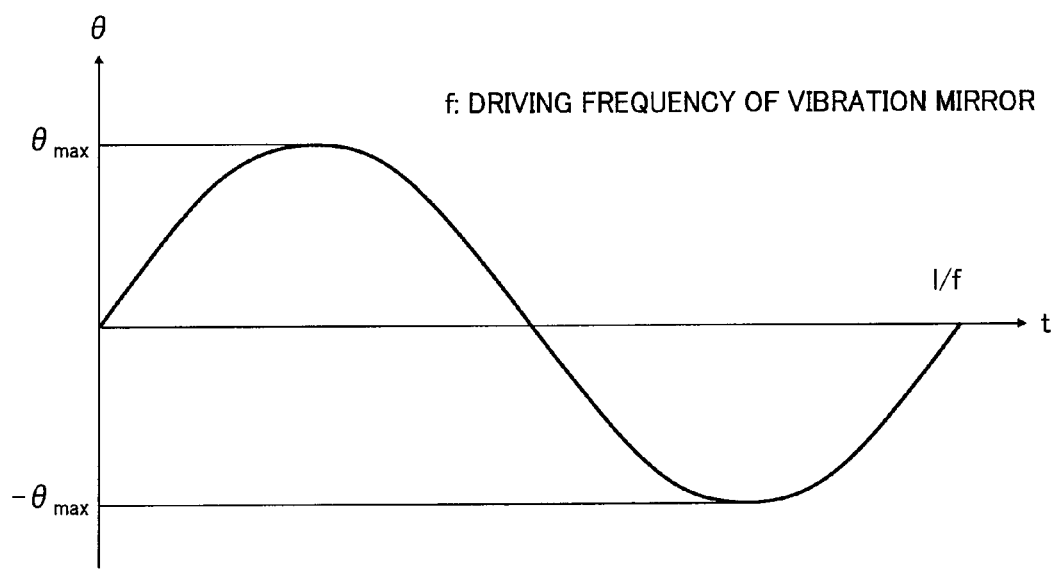
FIG. 27 is a drawing that depicts changes of a deflection angle θ when a vibration mirror vibrates in a sine wave with a driving frequency f.

It is assumed that, as depicted in FIG. 26, when L is a distance from the optical deflector (vibration mirror) to the surface to be scanned (image surface), Y is an image height, and the vibration mirror vibrates in a sine wave with a driving frequency f, as depicted in FIG. 27. At this time, as for the image height Y on the image surface, the linearity V can be represented by:

$$V = \frac{dY}{dt} = \frac{dY}{d\theta} \cdot \frac{d\theta}{dt} = \frac{d(L\tan\theta)}{d\theta} \cdot \omega = \frac{L\omega}{\cos^2\theta}$$

As for the angular velocity $\omega$, from the deflection angle characteristic of a sine vibration mirror, that is, $$\theta = \theta_{max} \sin 2\pi ft \qquad (a),$$

the following equation holds:

$$\omega = d\theta/dt = 2\pi\theta_{max} f \cos 2\pi ft \qquad (b).$$

Here, from the equation (a), $$2\pi ft = \sin^{-1}(\theta/\theta_{max}) \qquad (a'),$$

and when the equation (a') is substituted into the equation (b), Equation (2) explained above holds as follows:

$$\omega = \frac{d\theta}{dt} = 2\pi\theta_{max} f \cos 2\pi ft = 2\pi\theta_{max} f \cos\left[\sin^{-1}\left(\frac{\theta}{\theta_{max}}\right)\right] \qquad (2)$$

Here, a linearity V(0) at a center image height is represented as follows:

$$V(0) = L\omega_0/\cos^2(0), \text{ and}$$

$$\omega_0 = 2\pi\theta_{max} f \cos[\sin^{-1}(0)] = 2\pi\theta_{max} f, \text{ and therefore}$$

$$V(0) = L \cdot 2\pi\theta_{max} f.$$

A linearity (V($\theta$)−V(0))/V(0) with the deflection angle $\theta$ of the sine-wave vibration mirror with reference to the linearity V(0) at the center image height is derived as follows, which is the linearity in the conditional expression represented by Equation (4):

$$\frac{V(\theta) - V(0)}{V(0)} \qquad \text{(the linearity in Equation (3))}$$

$$V(\theta) = \frac{L}{\cos^2(\theta)} \cdot 2\pi\theta_{max} f \cos\left[\sin^{-1}\left(\frac{\theta}{\theta_{max}}\right)\right]$$

therefore $$\frac{V(\theta) - V(0)}{V(0)} =$$

$$\left( \frac{1}{\cos^2(\theta)} \cos\left[\sin^{-1}\left(\frac{\theta}{\theta_{max}}\right)\right] - 1 \right) \cdot 100[\%]$$

Figure 18:
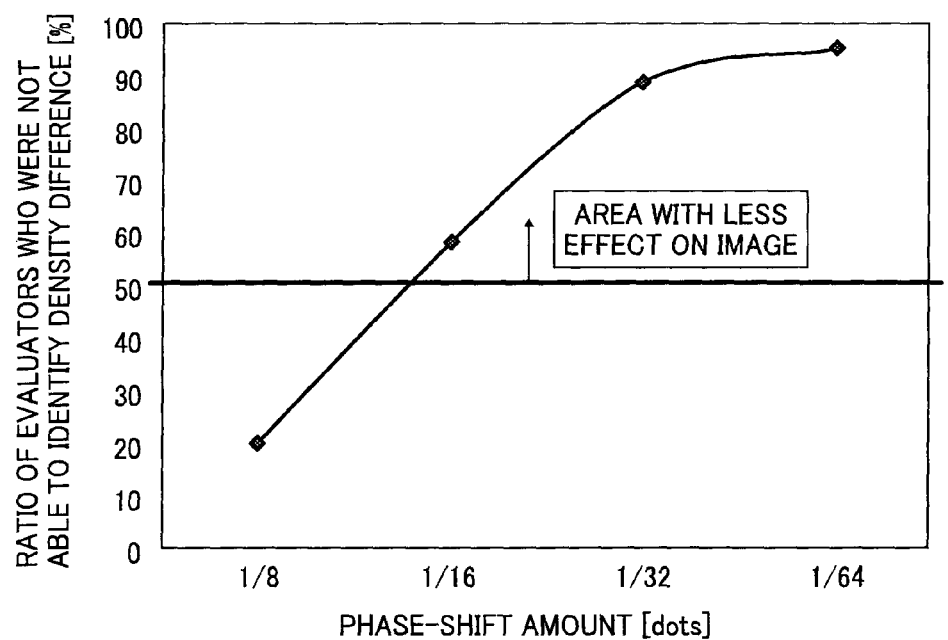
FIG. 18 is a drawing that depicts degrees of identification of stepwise density difference based on a sensory evaluation.

FIG. 18 depicts degrees of identification of stepwise density difference based on a sensory evaluation. The horizontal axis represents a phase-shift amount at each pixel and, for example, a value of 1/16 dot represents that the shift amount at each pixel is a 1/16 unit of a pixel pitch. The vertical axis represents a ratio of evaluators who were not able to identify a density difference. As this value is larger, an image deterioration is suppressed more when an electrical correction is applied. According to FIG. 18, when the shift amount of each pixel is equal to or smaller than a 1/16 unit of the pixel pitch, 50% or more evaluators were not able to identify a density difference, meaning that an image deterioration has been suppressed. Based on this, the limitation value of the amount of correction is set at a 1/16 unit (±12.5%) of the pixel pitch.

When the light-source clock is controlled so as to exceed this limitation value of the amount of correction, another adverse effect, such a density difference, occurs in image quality to correct the linearity, thereby causing a deterioration in image quality. For this reason, the image quality can be more efficiently improved when the vibration mirror 106 is driven under the condition satisfying Equation (3).

For example, when $\theta_{max}$=20 degrees, $\theta$ with Equation (3) not below −12.5% is 30.3 degrees. When $\theta_{max}$=30 degrees, $\theta$ with Equation (3) not above 12.5% is 27.0 degrees. These values should be more optimally designed according to conditions, such as the optical-path length and the angle of view of the write optical system.

In the optical scanning device according to the present embodiment, a more preferable case is such that the vibration mirror is driven under a condition near θmax=22 degrees. As evident from FIG. 11, in the case of θmax=22 degrees, the linearity is suppressed to less than 1% over a range near effective angles of view 0 degrees to 30 degrees often used in configuring a write optical system by using a vibration mirror. Thus, the linearity can be more efficiently corrected, and the image quality can be improved.

Second Embodiment

In the first embodiment explained above, the stepping motor in FIG. 6 is used as a unit of driving the coupling lens in the optical-axis direction. Alternatively, as a light-source unit 700 depicted in FIGS. 16A and 16B, an actuator, such as a voice coil, may be used.

Figure 16A:
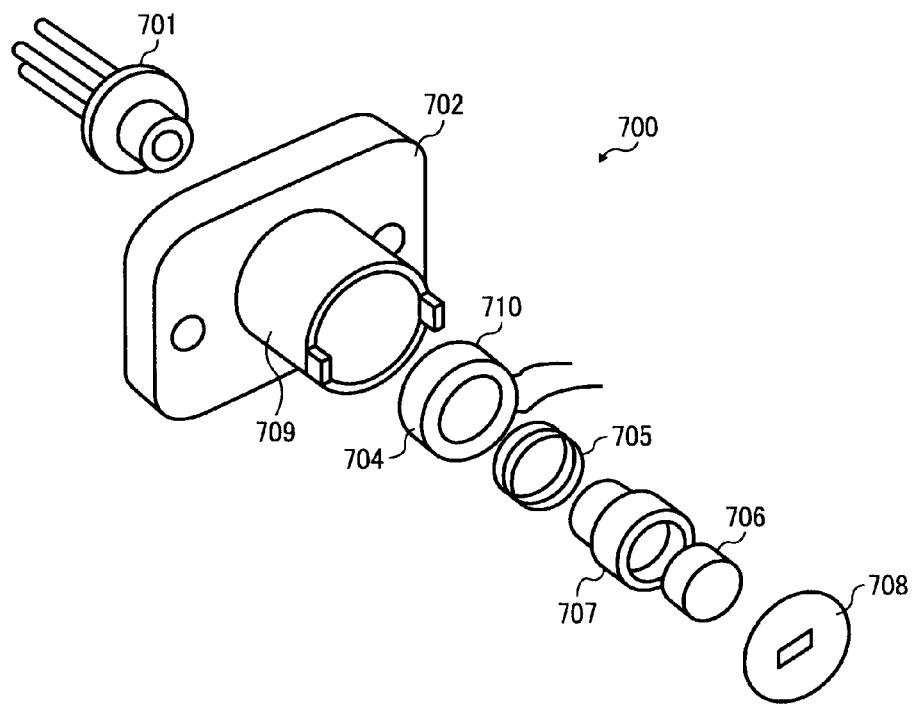
FIGS. 16A and 16B are drawings for explaining the configuration of a light-source unit including a unit that drives a coupling lens in an optical-axis direction.
Figure 16B:
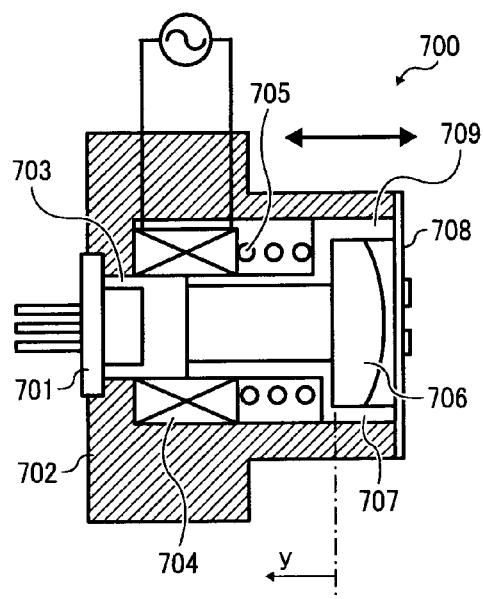

In FIGS. 16A and 16B, a semiconductor laser 701 as a light source fits in a through hole 703 of a holder member 702 by pressure from a side opposite to a surface that abuts on a housing not shown coaxially with the through hole 703. On the surface side that abuts on the housing of the holder member 702, a cylindrical portion 709 is integrally formed coaxially with the through hole 703. Along an internal circle of the cylindrical portion, an electromagnetic coil 704 wounded in a cylindrical shape is inserted. A reference numeral 706 represents a coupling lens, such as a collimator lens. The coupling lens 706 forms a first image-formation optical system that converts the light beam from the light-emitting source to be in a converging state or a diverging state, and is adhesively fixed to an inner perimeter side of a front-end large-diameter portion of a lens cell 707 shaped in a hollow cylinder. The lens cell 707 has its rear-end small-diameter portion inserted in a center portion of the electromagnetic coil 704.

A coil spring 705 is inserted on an outer perimeter side of the lens cell 707 so as to be interposed in a compressed state between a front-end surface of the electromagnetic coil 704 and a rear-end surface of the large-diameter portion of the lens cell 707. The lens cell 707 is held as being inserted in an entrance side of the cylindrical portion 709 of the holder member 702, and has an outer perimeter portion engaged with a protrusion formed at a front end of the holder member 702, thereby defining a limitation of movement of the lens cell 707 by a pressing force of the spring 705. The entrance of the cylindrical portion 709 of the holder member 702 is sealed with a cap 708 also serving as an aperture, from which a light beam with a predetermined ray-bundle diameter is emitted.

The lens cell 707 is made of metal. When a current flows through the electromagnetic coil 704, the lens cell 707 is compressed against elasticity of the spring 705 to be drawn to the electromagnetic coil 704. By controlling the amount of current, the distance from the light-emitting source to the coupling lens 706 can be flexibly changed. As evident from above, the electromagnetic coil 704 forms an image-formation-position changing unit that moves the coupling lens 706 in the optical-axis direction in a reciprocating manner to move an image-formation position on the surface to be scanned.

In the present embodiment, an initial position is set by applying a predetermined bias current to the electromagnetic coil 704, and then an alternating current is applied. With this, the lens cell 707 moves in a reciprocating manner along the inner circle of the cylindrical portion 709.

Furthermore, this driving is performed by using a driving circuit similar to that in FIG. 6 in synchronization with a scanning state of the vibration mirror 106, thereby stably correcting a field curvature and uniformly adjusting the beam-spot diameters on the surface of the photosensitive member.

Third Embodiment

Figure 23:
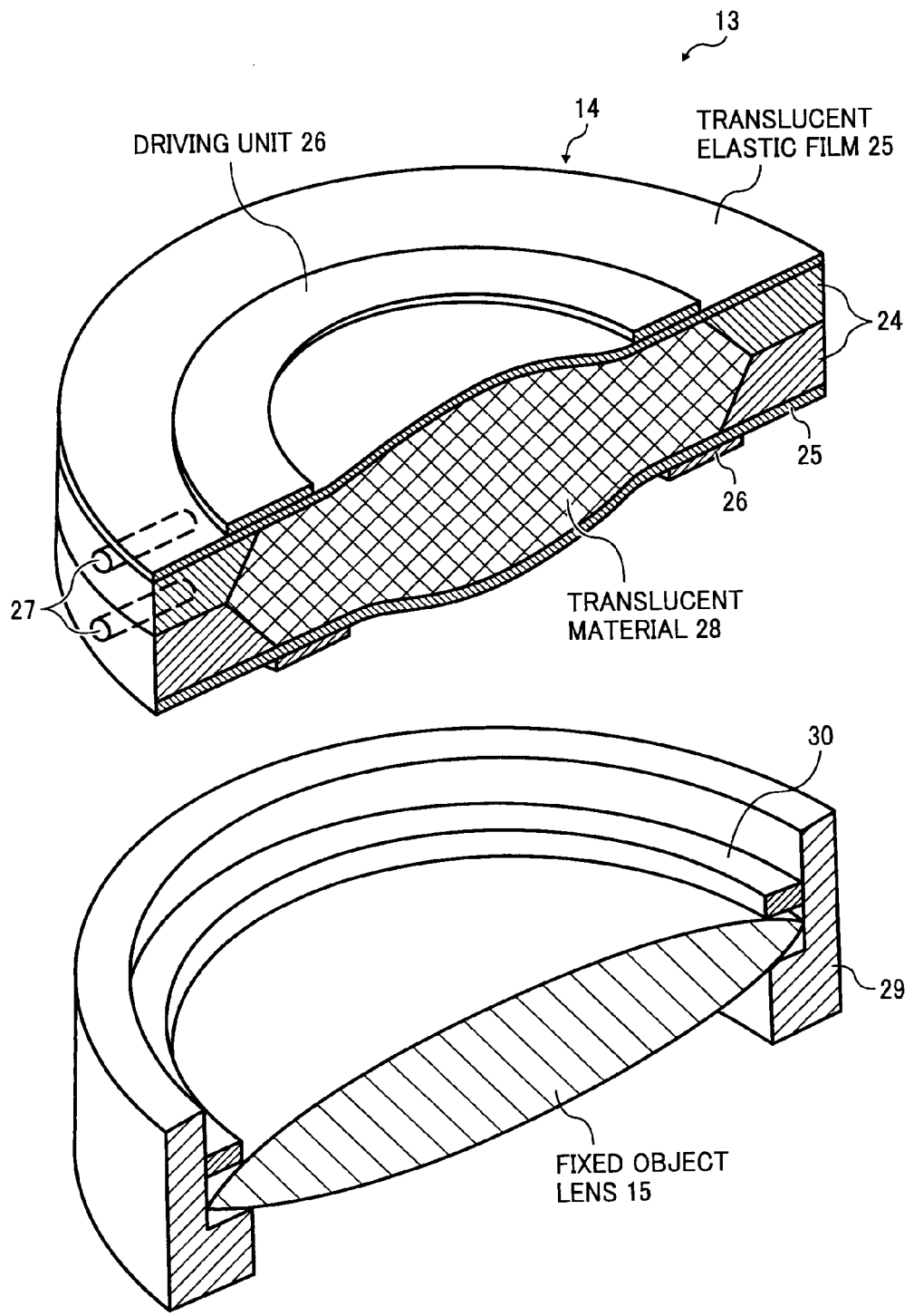
FIG. 23 is a perspective cross-section view of a variable-focus lens for use as an image-formation position changing unit.
Figure 24:
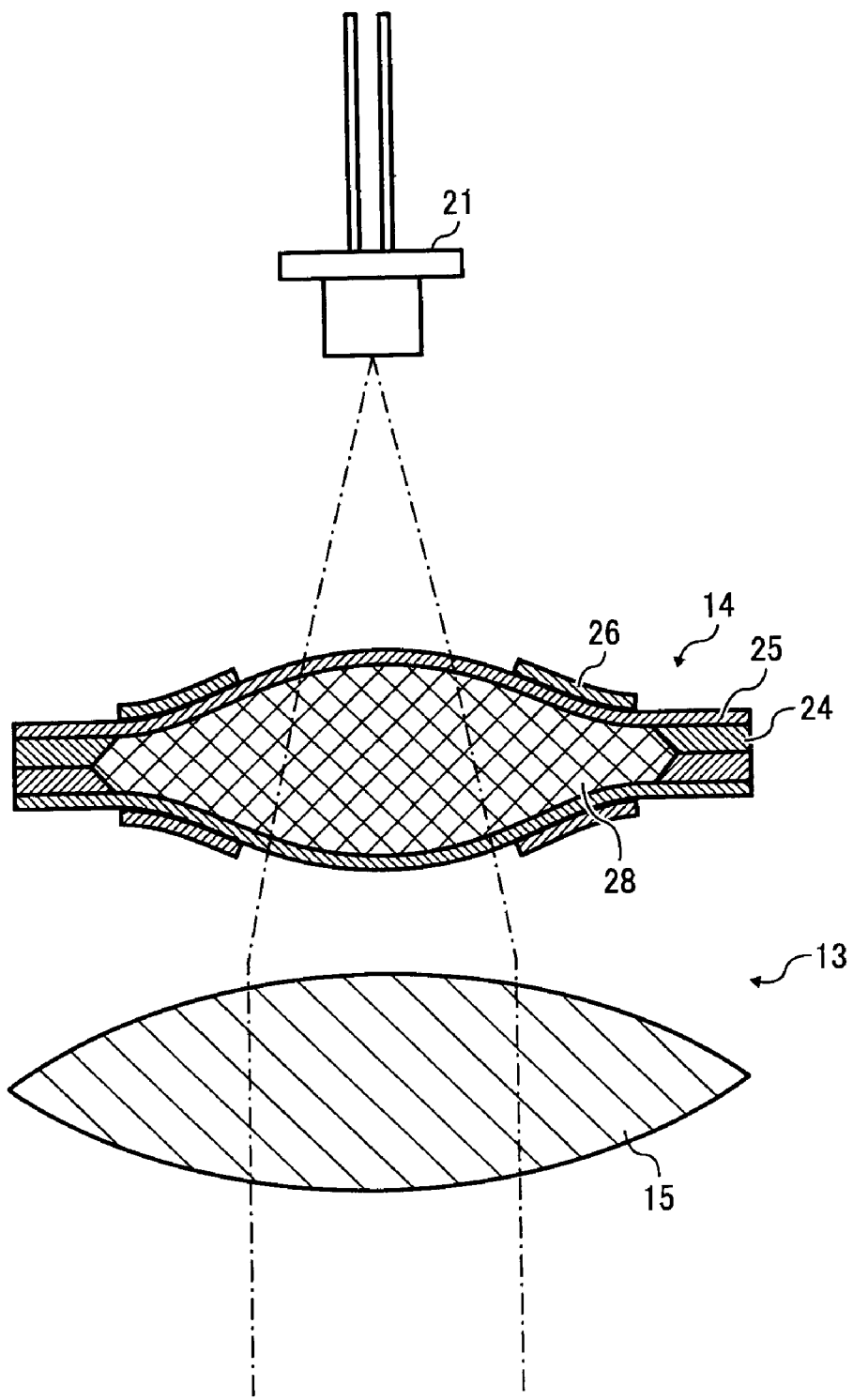
FIG. 24 is a schematic cross-section view of a configuration example of a light-source unit using a variable-focus lens as a coupling lens.

Next, a third embodiment is explained in which a variable-focus lens as depicted in FIG. 23 is used as a coupling lens to make the beam-spot diameters on the surface of the photosensitive member uniform. A configuration example of a light-source unit using this variable-focus lens as a coupling lens is depicted in FIG. 24.

This light-source unit includes a light source 21 and a variable-focus lens unit 13. The variable-focus lens unit 13 includes a variable-focus lens 14 and a fixed object lens 15.

FIG. 23 depicts a detailed drawing of the variable-focus lens unit 13. The variable-focus lens 14 of this variable-focus lens unit 13 has the following configuration so as to have a thin thickness with respect to a focal length of the fixed object lens 15.

With respect to an annular silicon spacer 24, a thin-film glass diaphragm 25 as a translucent elastic film is jointed through positive-polarity junction. On the glass diaphragm 25, a piezoelectric element 26 made of, for example, lead zirconate titanate (PZT), as a driving unit is formed in an annular shape through a film-forming method, such as sputtering. Also, although not shown, the glass diaphragm 25 is formed so as to have a film-thickness distribution in which the film thickness is gradually thinner to a center portion. With this, optical aberration of the variable focus-lens unit 13 can be reduced.

A fixed object lens 15 is fixed by, for example, adhesion, as being interposed between an inner-edge step portion of a lens holder 29 and a holding ring 30. The variable focus-lens 14 and the fixed object lens 15 explained above are integrated together with their outer edges being jointed together by, for example, adhesion.

By driving the piezoelectric element 26, the curvature of the glass diaphragm 25 is changed to change the focal length of the variable focus-lens unit 13. This driving is synchronized with driving of the vibration mirror 106, fluctuations in field curvature can be stably suppressed as a system.

Fourth Embodiment

Figure 14:
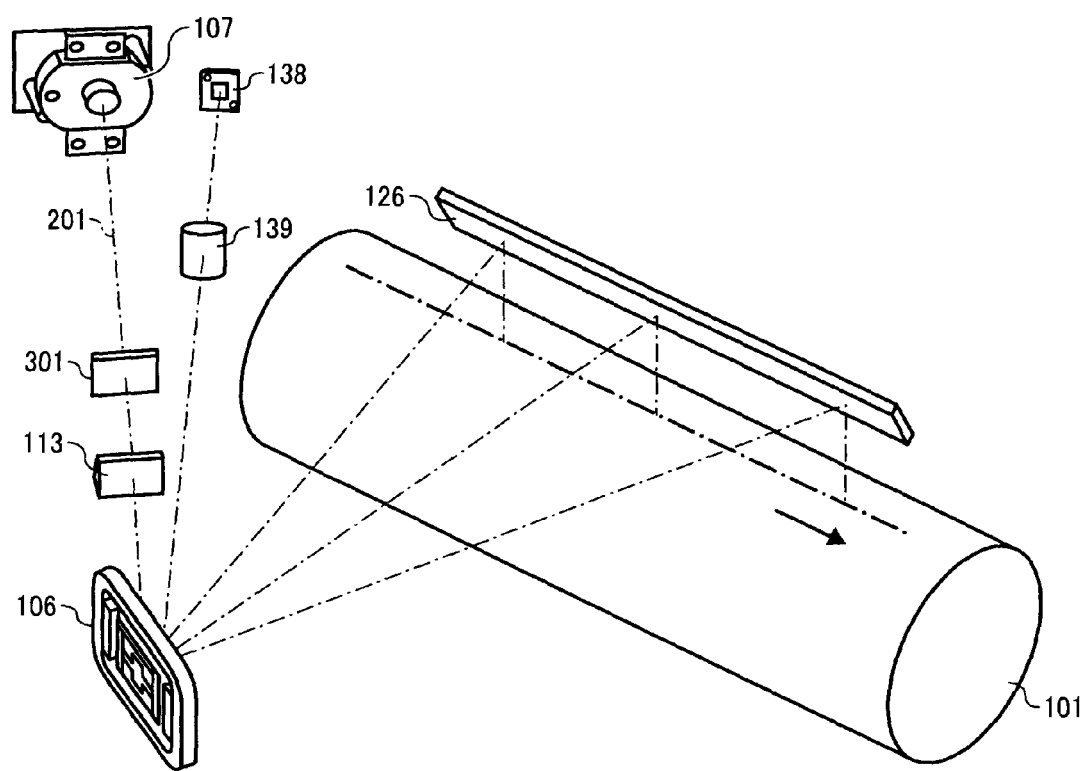
FIG. 14 is a schematic drawing of the configuration of an optical scanning device for explaining another embodiment of the present invention.

Next, a fourth embodiment is explained by using FIG. 14, in which a depth enlarging unit is used, instead of moving the coupling lens in an optical-axis direction for correction in field curvature, to make the beam-spot diameters uniform on the surface of the photosensitive member.

The basic configuration of the optical scanning device of FIG. 14 is similar to the configuration of FIG. 1 explained in the first embodiment, but is different therefrom in that a depth enlarging unit 301 is disposed between the light-source unit 107 and the vibration mirror 106. Also, the optical scanning device according to the present embodiment does not include a unit of moving the coupling lens in an optical-axis direction, which is as depicted in FIG. 6 and disposed in the first embodiment.

The depth enlarging unit 301 is provided with a phase-type optical element that increases a side-lobe peak intensity, for example. With this, a depth margin is enlarged. A large ratio of enlarging a depth margin can be achieved with a larger side-lobe peak intensity.

Specifically, for example, as the depth enlarging element 301, an intensity-distribution converting element may be added to an optical path between the light-source unit 107 and the vibration mirror 106, the element converting an intensity distribution on an exit pupil so that the intensity at four edge corners is higher than the intensity at a center portion. Alternatively, as the depth enlarging element 301, a phase-distribution converting element may be added to the optical path between the light-source unit 107 and the vibration mirror 106, the element arbitrarily converting a phase distribution of a ray bundle on the exit pupil. Still alternatively, as the depth enlarging elements 301, a phase-distribution converting element and an intensity-distribution converting element may be added to the optical path between the light-source unit 107 and the vibration mirror 106, the phase-distribution converting element converting a phase distribution of a ray bundle on the exit pupil and the intensity-distribution converting element converting an intensity distribution. Still alternatively, as the depth enlarging element 301, an optical element integrally formed of a phase-distribution converting element and an intensity-distribution converting element may be added.

Figure 19:
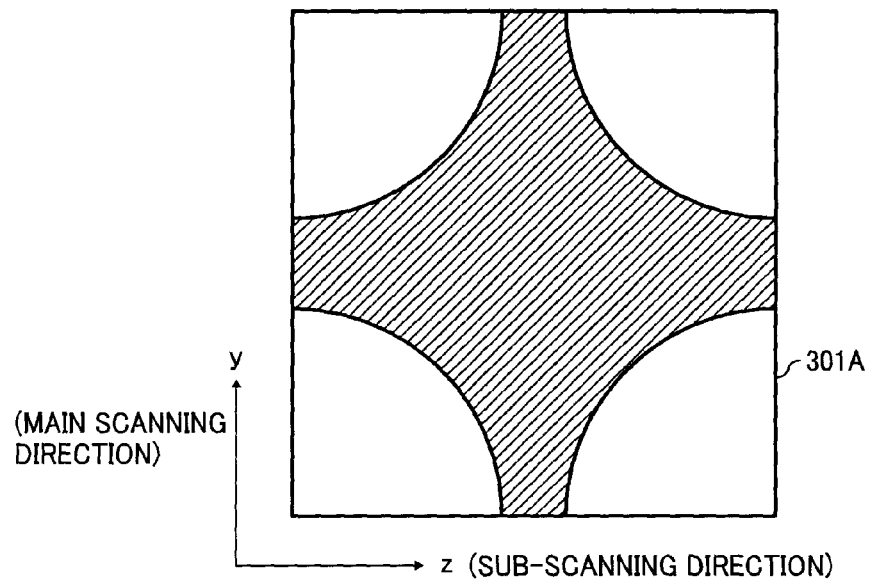
FIG. 19 is a drawing of an example of an optical element (depth enlarging element) for use as a depth enlarging unit, and is a plan view of a diffraction optical element.
Figure 20:
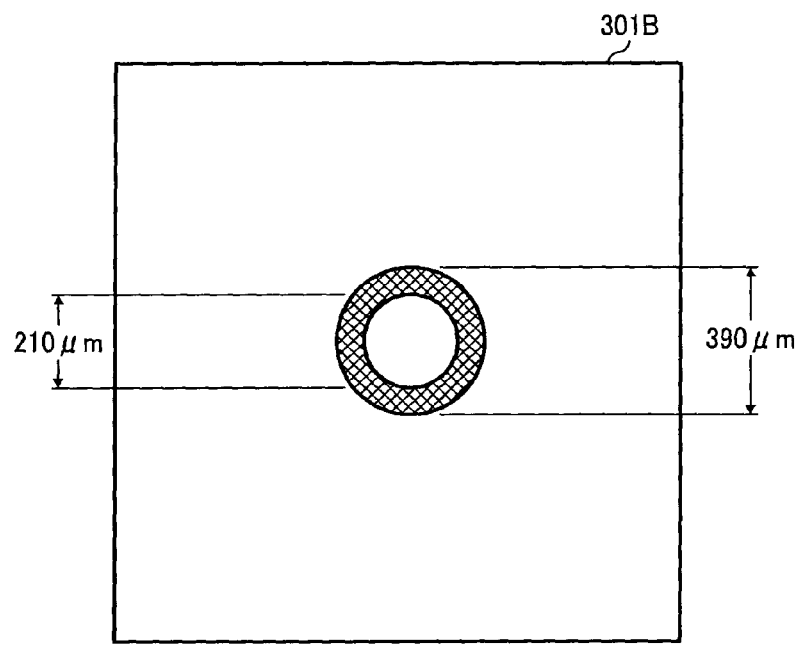
FIG. 20 is a drawing of another example of the optical element (depth enlarging element) for use as a depth enlarging unit, and is a plan view of a diffraction optical element.
Figure 21:
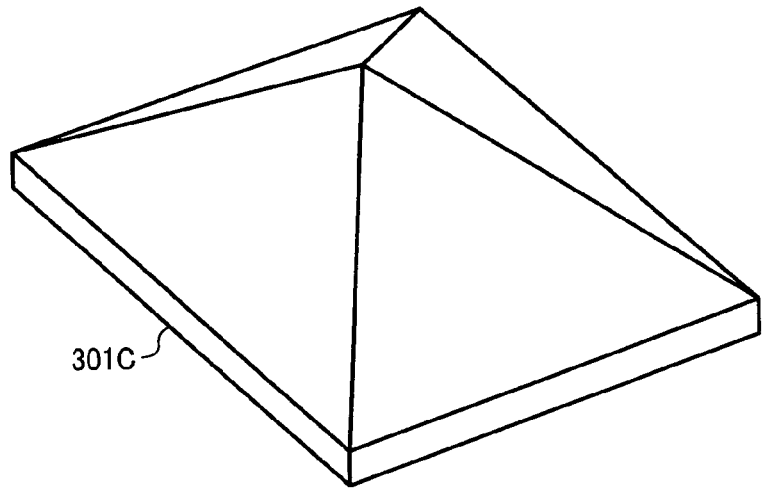
FIG. 21 is a drawing of still another example of the optical element (depth enlarging element) for use as a depth enlarging unit, and is a perspective view of a square-pyramid prism.
Figure 22:
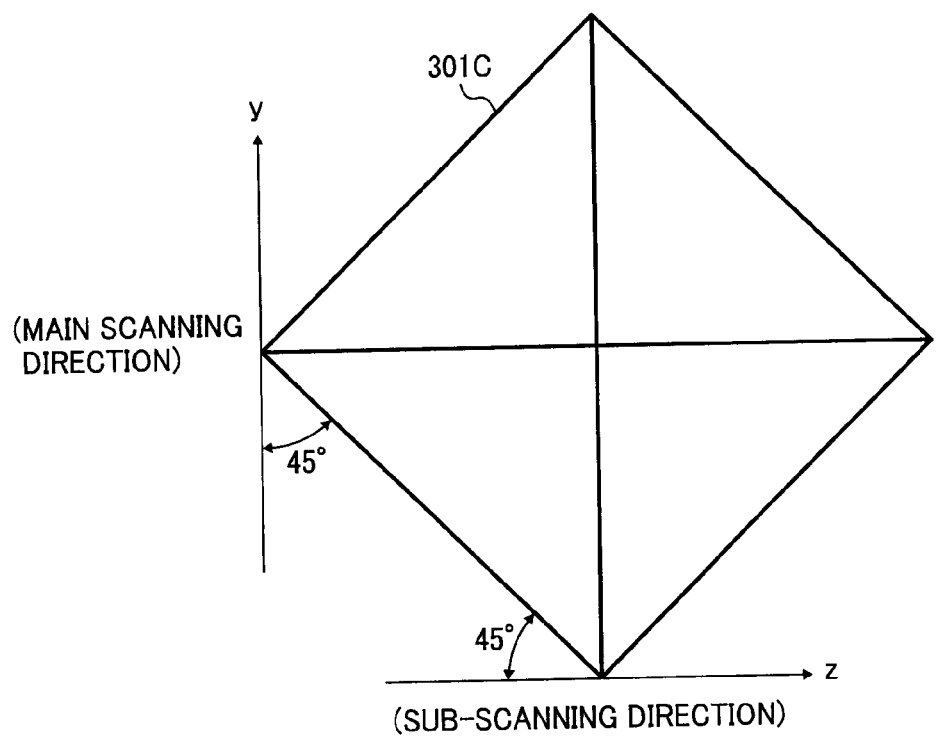
FIG. 22 is a drawing of still another example of the optical element (depth enlarging element) for use as a depth enlarging unit, and is a plan view of a square-pyramid prism.

Specific examples of the intensity-distribution converting element to convert the intensity distribution include a diffraction optical element 301A with a stepwise binary-grating structure as depicted in FIG. 19, a diffraction optical element 301B with a diffraction pattern in a ring structure as depicted in FIG. 20, and a density filter in which a square-pyramid prism 301C as depicted in FIG. 21 is used to increase a transmittance only in a diagonal direction. Also, a scheme may be taken in which a square-pyramid prism 301C as depicted in FIG. 22 is used as being tilted by approximately 45 degrees in main and sub-scanning directions.

By using any of the various depth enlarging elements 301 as explained above for the optical scanning device according to the present invention, the depth of the beam-waist diameter can be enlarged. A field curvature can be corrected when no scanning image-formation optical system is present, and the beam-spot diameters on the surface of the photosensitive member can be kept uniform. Furthermore, an image with high image quality can be formed.

Fifth Embodiment

Next, a fifth embodiment is explained in which the light-source driving unit includes a light-amount adjusting unit and the light-amount adjusting unit makes energy of the light beam per unit time uniform at each scanning position on the surface to be scanned.

In the present embodiment, as a light-amount adjusting unit, in place of providing a shading effect to an optical element, an auto power control (APC), is used for a light-source driving unit.

APC is a scheme of monitoring a light output from the semiconductor laser by a light-receiving element and, by using a detection signal of a light-receiving current proportional to the light output from the semiconductor laser, controlling a forward-direction current of the semiconductor laser so that the current has a desired value.

When the semiconductor laser is a semiconductor laser of an end-face light-emission type, a photodiode that monitors light emitted in a direction opposite to a direction of emitting light to the coupling lens is often used as the light-receiving element. When unwanted ghost light enters at the time of APC, the amount of light to be detected by the light-receiving element is disadvantageously increased.

For example, when an incident angle of the beam to the vibration mirror 106 is 0, the reflecting surface of that vibration mirror 106 faces straightforward in a light-source direction. Therefore, when APC is performed at this position, the reflected beam is returned to the light source to increase the light amount to be detected at the light-receiving element. For this reason, a laser output from the vibration mirror that performs writing becomes a light-emission output less than an output as intended, thereby disadvantageously decreasing an image density and causing an unevenness in density.

To get around this, APC is set as not being performed when the incident angle of the vibration mirror 106 is 0. With this configuration, an image output with an appropriate density and less unevenness in density can be achieved.

Sixth Embodiment

Figure 15:
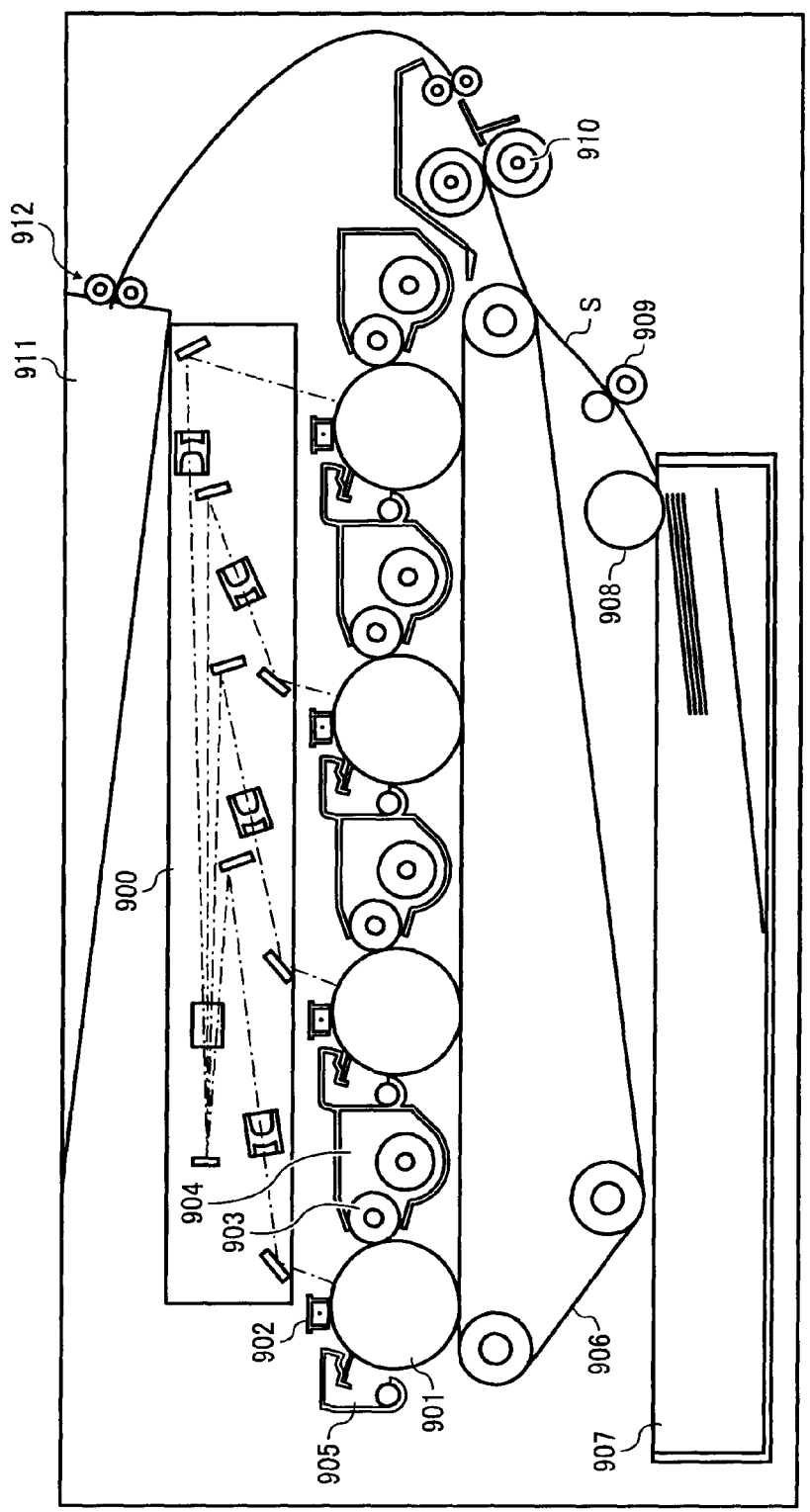
FIG. 15 is a drawing of an example of an image forming apparatus having incorporated therein the optical scanning device according to the present invention, schematically depicting the configuration of a multicolor-capable, tandem-type image forming apparatus.

Next, as a sixth embodiment, an example of an image forming apparatus having incorporated therein the optical scanning device according to the present invention is depicted in FIG. 15.

This image forming apparatus represents an example of a multicolor-capable, tandem-type image forming apparatus including four image forming stations. Here, one of these image forming stations is explained. Disposed around a photosensitive drum 901 are a charger that charges the photosensitive drum 901 to a high voltage, a developing roller 903 that attaches charged toner to an electrostatic latent image recorded with a light beam from an optical scanning device 900 for image development, a toner cartridge 904 that adds toner to the developing roller, and a cleaning case 905 that scrapes toner left on the photosensitive drum 901 for stock. To the photosensitive drum 901, with reciprocating scanning of the vibration mirror explained above of the optical scanning device 900, image recording for every two lines is performed in one cycle.

Four such image forming stations are arranged in parallel along a direction of movement of an intermediate transfer belt 906. With these four image forming stations, toner images of yellow, magenta, cyan, and black are formed on the photosensitive drum 901, and then are sequentially transferred and superposed onto the intermediate transfer belt 906 in timing by a primary transfer unit not shown (a transfer roller, a transfer brush, a transfer charger, and others disposed on a rear surface side of the belt at a position facing the photosensitive drum), thereby forming a color image. Each image forming station has basically the same configuration with merely a different toner color.

On the other hand, a recording sheet S is supplied from a paper-feeding tray 907 by a paper-feeding roller 908, and is sent by paired resist rollers 909 in timing with the start of recording in a sub-scanning direction. With a secondary transfer unit not shown (a secondary transfer roller, a transfer brush, a transfer charger, and others), a toner image is transferred from the intermediate transfer belt 906 onto the recording sheet S. The not-yet-fixed toner image transferred onto the recording sheet S is fixed by paired rollers 910 of a fixing device 910, and the sheet is then delivered by delivery rollers 912 to a paper-delivery tray 911.

Figure 25:
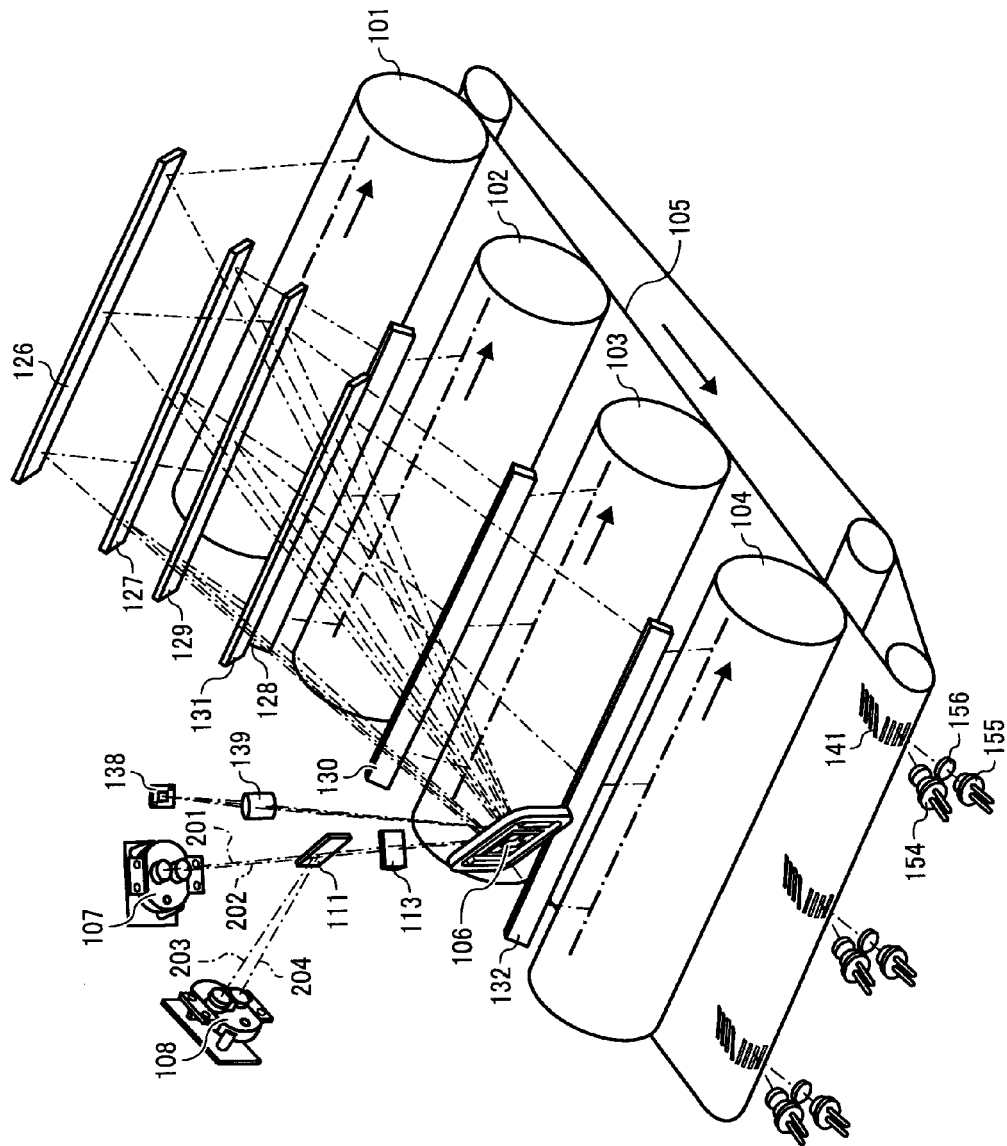
FIG. 25 is a schematic perspective view of a configuration example of an optical scanning device for use in the image forming apparatus depicted in FIG. 15.

FIG. 25 is a schematic perspective view of a configuration example of the optical scanning device 900 for use in the image forming apparatus depicted in FIG. 15. In FIG. 25, reference numerals 101 to 104 correspond to the photosensitive drums 901 of the image forming apparatus depicted in FIG. 15, and a reference numeral 105 corresponds to the intermediate transfer belt 906.

The optical scanning device depicted in FIG. 25 includes two sets of a light source and a coupling lens and two light-source units each emitting two light beams. Light beams 201 to 204 for respective image forming stations emitted from light-source units 107 and 108 that each emit two light beams are applied through an incident mirror 111 and a cylindrical lens 113 onto one vibration mirror 106 as a linear image elongated in a main scanning direction.

Light beams 201 to 204 subjected to deflection scanning by the vibration mirror 106 are guided to the photosensitive drums 101 to 104, respectively, for forming images of respective colors, that is, yellow, magenta, cyan, and black, via folding mirrors 126 to 132. With exposure to light, electrostatic latent images corresponding to the respective colors are formed on the photosensitive drums 101 to 104.

The electrostatic latent images formed on the photosensitive drums 101 to 104 are developed with the respective colors of toners by developing units (developing rollers, for example) of the respective image forming stations, thereby forming toner images of the respective colors, that is, yellow, magenta, cyan, and black, on the photosensitive drums 101 to 104.

The toner images of yellow, magenta, cyan, and black formed on the photosensitive drums 101 to 104 are sequentially transferred and superposed in timing onto the intermediate transfer belt 105 to form a color image. The color image formed through transfer onto the intermediate transfer belt 105 is transferred and fixed onto a recording sheet, as explained above, thereby obtaining a color image.

Here, in FIG. 25, a reference numeral 141 represents a register mark regularly formed on the intermediate transfer belt to detect a transfer position of a toner image and a color shift. This register mark is detected by a register-mark detecting unit including, for example, light-emitting elements 154, such as LEDs, a converging lens 156, and a light-receiving lens 155. The detection signal is sent to the write controlling unit 607 of FIG. 6 to control the driving of the light sources of the light-source units 107 and 108 for correction of positional shift and color shift.

Here, in the embodiments, the configuration using an intermediate transfer belt is explained. Alternatively, the configuration may be such that a recording-sheet conveying belt is used in place of the intermediate transfer belt for directly transferring the toner images from the photosensitive drums 101 to 104 to the recording sheet.

Also, as light sources provided to the light-source units 107 and 108, multibeam light sources may be used, such as semiconductor laser arrays having a plurality of light-emitting units or light sources formed by combining a plurality of semiconductor lasers. In this case, a plurality of lines can be simultaneously written at one scanning, thereby further increasing the speed of image formation.

In the foregoing, while the embodiments of the optical scanning device and image forming apparatus using the optical scanning device according to the present invention have been explained, the present invention is not restricted to the configuration of the embodiments, but can be variously modified.

For example, as an example of an optical scanning device that supports a tandem-type image forming apparatus, an example of a one-side scanning scheme is depicted in FIG. 25. Alternatively, with a configuration in which two optical systems are disposed so as to face each other across the vibration mirror 106 to use both surfaces of the vibration mirror 106 as deflection reflecting surfaces, facing-scanning optical scanning device can be easily achieved.

The optical scanning device according to the present invention can be applied not only to image forming apparatuses but also to optical-scanning bar-code reading devices, vehicle-mounted laser radar devices, and others.

In optical scanning devices according to first and second aspects of the present invention, the linearity can be suppressed to an excellent value without provision of a scanning image-formation optical system. Also, since no scanning image-formation optical system is required, the image quality can be improved accordingly due to the improvement in beam quality. Furthermore, cost can be reduced, the system can be simplified, and stability can be improved.

In an optical scanning device according to a third aspect of the present invention, the linearity can be further efficiently suppressed to an excellent value without provision of a scanning image-formation optical system.

In optical scanning devices according to fourth to sixth aspects of the present invention, the linearity can be kept at an excellent value, thereby improving the image quality.

Furthermore, in an optical scanning device according to a seventh aspect, the amount of correction of the linearity can be significantly increased. Therefore, the linearity can be further efficiently kept at an excellent value, thereby improving the image quality.

In an optical scanning device according to an eighth aspect, the field curvature is excellently corrected, and the beam-spot diameters on the surface to be scanned are uniformly adjusted, thereby improving the image quality.

Still further, in an optical scanning device according to a ninth aspect, the beam-spot diameters on the surface to be scanned can be further stably made uniform, thereby improving the image quality.

Still further, in an optical scanning device according to a tenth aspect, even when a field curvature is present, the beam-spot diameters on the surface to be scanned are uniformly adjusted, thereby improving the image quality.

In an optical scanning device according to an eleventh aspect, energy for exposing the surface to be scanned (for example, a photosensitive member) to light is made constant at each scanning position, thereby providing a high-quality image without, for example, unevenness in density.

Still further, in an optical scanning device according to a twelfth aspect, energy of a light beam per unit time on the surface to be scanned is made uniform, and energy for exposing the surface to be scanned (for example, a photosensitive member) to light is made constant at each scanning position, thereby providing a high-quality image without, for example, unevenness in density.

Still further, in an optical scanning device according to a thirteenth aspect, a plurality of surfaces to be scanned can be simultaneously scanned with a simple configuration.

In image forming apparatuses according to fourteenth and sixteenth aspects, the apparatuses are configured by using an optical scanning device that does not require a scanning image-formation optical element that may cause a deterioration in wavefront of a light beam while keeping scanning-speed uniformity, thereby improving the quality of the image forming apparatuses, reducing cost, simplifying the system, and also improving stability.

In multicolor-capable image forming apparatuses according to fifteenth and sixteenth aspects, the multicolor image forming apparatuses are configured by using an optical scanning device that does not require a scanning image-formation optical element that may cause a deterioration in wavefront of a light beam while keeping scanning-speed uniformity and is capable of simultaneously scanning a plurality of surfaces to be scanned, thereby improving the quality of the multicolor image forming apparatuses, reducing cost, simplifying the system, and also improving stability.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
a light source;
a light-source driving unit that controls a modulation clock for modulating the light source;
an optical element that causes a light beam from the light source to be in a predetermined state; and
at least one optical deflector formed of a vibration mirror supported by a torsion bar to deflect the light beam from the light source to scan a target surface, wherein
in an effective scanning area in the target surface, at least the light-source driving unit and the optical deflector provide a mechanism that causes a scanning speed at each scanning position with respect to a scanning speed at an approximately center in the effective scanning area to be within a range that satisfies a condition represented by $$-12.5[\%] < \left(\frac{\cos\left(\arcsin\left(\frac{\theta}{\theta_{max}}\right)\right)}{\cos^2\theta} - 1\right) \times 100 < 12.5[\%]$$

where $\theta$ is a deflection angle of the optical deflector and $\theta_{max}$ is near 22 degrees as a maximum deflection angle of the optical deflector.

2. The optical scanning device according to claim 1, wherein the light-source driving unit changes a frequency of the modulation clock in synchronization with scanning of the optical deflector.

3. The optical scanning device according to claim 1, wherein the light-source driving unit changes a phase of the modulation clock in synchronization with scanning of the optical deflector.

4. The optical scanning device according to claim 1, wherein the light-source driving unit controls a phase of the modulation clock and changes the frequency of the modulation clock in synchronization with scanning of the optical deflector.

5. The optical scanning device according to claim 1, further comprising an image-formation-position changing unit that changes an image-formation position of the optical element within one scanning period.

6. The optical scanning device according to claim 5, wherein the image-formation-position changing unit moves the optical element in an optical-axis direction in synchronization with scanning of the optical deflector.

7. The optical scanning device according to claim 1, wherein the light beam with which the target surface is scanned by the optical deflector has an image-formation point near the target surface, and
the optical scanning device includes a depth enlarging unit that enlarges a depth of the image-formation point.

8. The optical scanning device according to claim 1, wherein at least any one of the optical elements that form the optical scanning device includes a shading effect to make energy of the light beam per unit time uniform at each scanning position on the target surface.

9. The optical scanning device according to claim 1, wherein the light-source driving unit includes a light-amount adjusting unit, and energy of the light beam per unit time is made uniform by the light-amount adjusting unit at each scanning position on the target surface.

* * * * *